(12) United States Patent
Gavrel et al.

(10) Patent No.: US 7,087,176 B2
(45) Date of Patent: Aug. 8, 2006

(54) HIGH PRESSURE PROCESS AND APPARATUS FOR THE ELECTROCOAGULATIVE TREATMENT OF AQUEOUS AND VISCOUS FLUIDS

(75) Inventors: Tom Gus Gavrel, Seabrook, TX (US); Ira B. Vinson, 719 Blackman St., Lake Charles, LA (US) 70605; David Wayne Otto, Shiner, TX (US)

(73) Assignees: Ira B. Vinson, El Lago, TX (US); Tom G. Gavrel, Seabrook, TX (US)

( * ) Notice: Subject to any disclaimer, the term of this patent is extended or adjusted under 35 U.S.C. 154(b) by 41 days.

(21) Appl. No.: 10/706,002

(22) Filed: Nov. 11, 2003

(65) Prior Publication Data

US 2004/0140218 A1     Jul. 22, 2004

Related U.S. Application Data

(60) Provisional application No. 60/425,358, filed on Nov. 11, 2002.

(51) Int. Cl.
*C02F 1/463* (2006.01)
*C25B 9/00* (2006.01)

(52) U.S. Cl. .............. 210/748; 210/243; 210/521; 204/571; 204/573; 204/668; 205/757

(58) Field of Classification Search .......... 210/702, 210/707, 748, 764, 198.1, 205, 243, 521; 204/554, 571, 573, 660, 668; 205/757
See application file for complete search history.

(56) References Cited

U.S. PATENT DOCUMENTS 672,231 A   4/1901   Lacomme 3,969,245 A   7/1976   Ramirez
(Continued)

FOREIGN PATENT DOCUMENTS

| DE | 3641365 A1 | 8/1988 |
| DE | 3641365 C2 | 8/1988 |
| WO | WO 00/73215 A2 | 12/2000 |
| WO | WO 03/032452 A1 | 4/2003 |

OTHER PUBLICATIONS

Metcalf & Eddy, Inc. (1990), Wastewater Engineering: Treatment, Disposal, Reuse, McGraw-Hill, Inc., New York, pp. 284-288.
Pincince et al., Water Environment Research Foundation (1998), Biosolids Management: Assessment of Innovative Processes, ISBN: 0-966-2553-5-6, 2 pages.

*Primary Examiner*—Frank M. Lawrence
(74) *Attorney, Agent, or Firm*—Bracewell & Giuliani LLP

(57) ABSTRACT

A method and apparatus for the high-pressure electrocoagulative treatment of aqueous and viscous fluids and sludge is provided. The apparatus includes a plate and frame design utilizing mechanical closure on a plurality of recessed, gasketed, non-electrically conductive electrocoagulation spacer plates that completely enclose and isolate all fluids, electrical contacts, and electrodes within the confines of the apparatus. The spacer plates include intergral supports that position and support said plates with enclosed electrodes on top of the side rails of the supporting frame of the apparatus allowing said plates to be separated for electrode replacement and maintenance and conversly closed, pressured and put into service. The apparatus includes a baffled influent and effluent chamber at both ends for the addition and flash mixing of chemical reagents and/or flocculants and to provide a means of fluid communication between fluid conduits and chambers formed within the apparatus.

19 Claims, 19 Drawing Sheets

U.S. PATENT DOCUMENTS 5,928,493 A * 7/1999 Morkovsky et al. ........ 205/757
6,139,710 A    10/2000 Powell
6,719,894 B1 * 4/2004 Gavrel et al. ................ 205/744
2003/0070919 A1 * 4/2003 Gilmore .................. 204/275.1

* cited by examiner

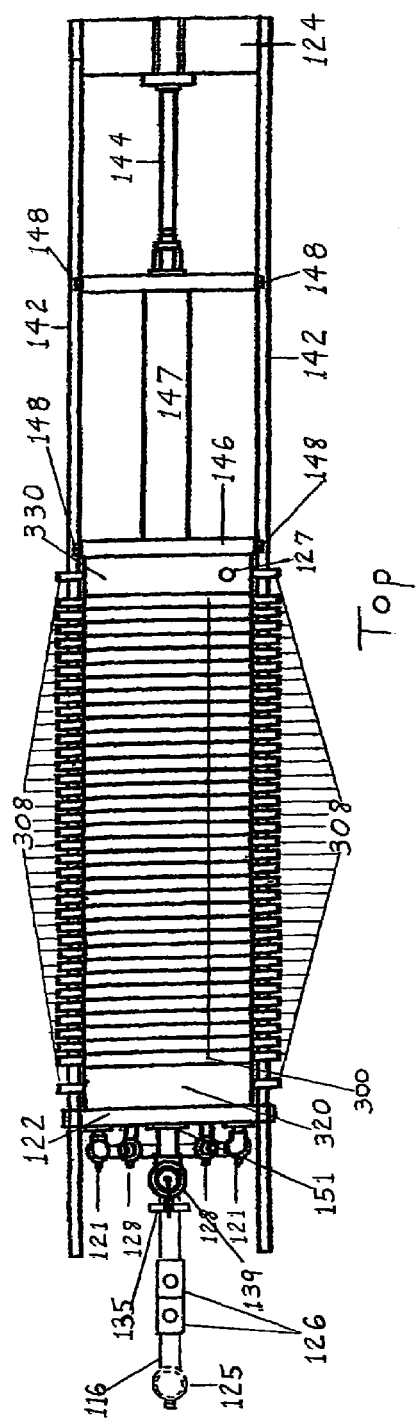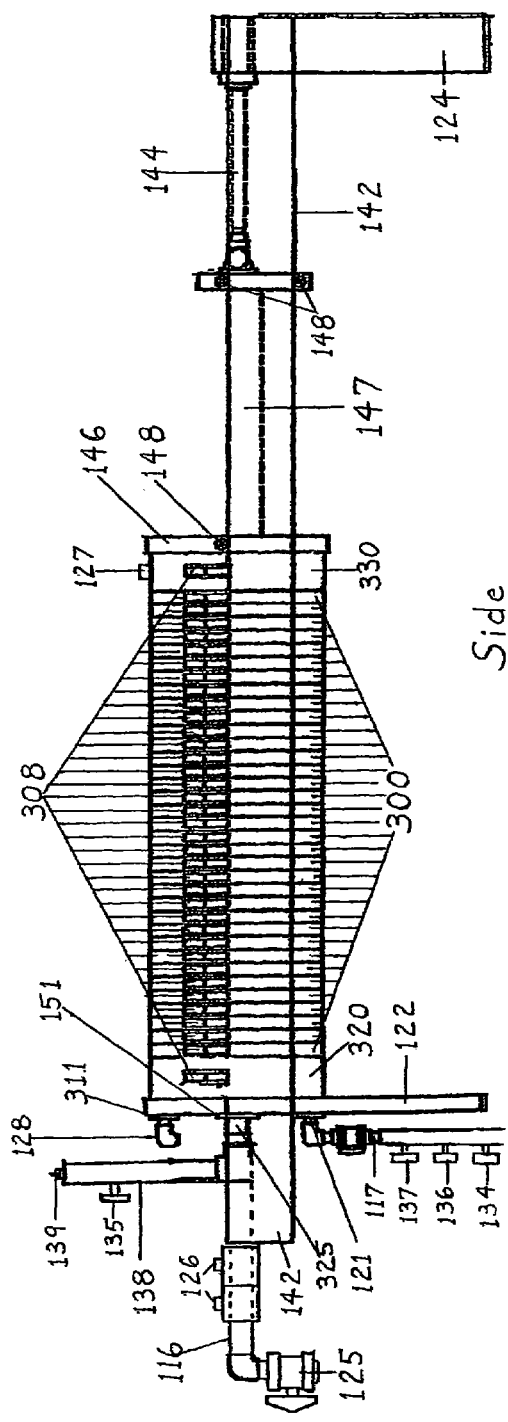
FIG. 2

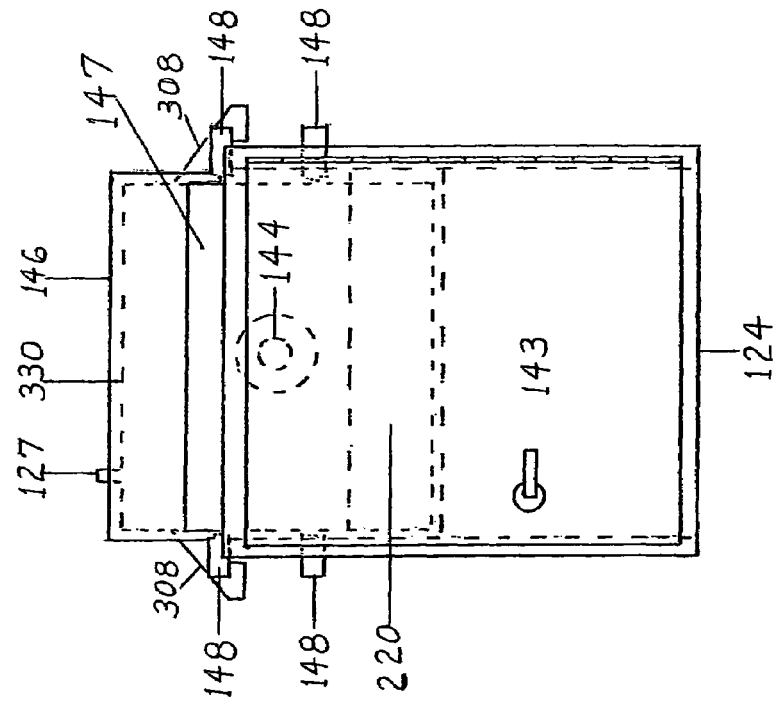
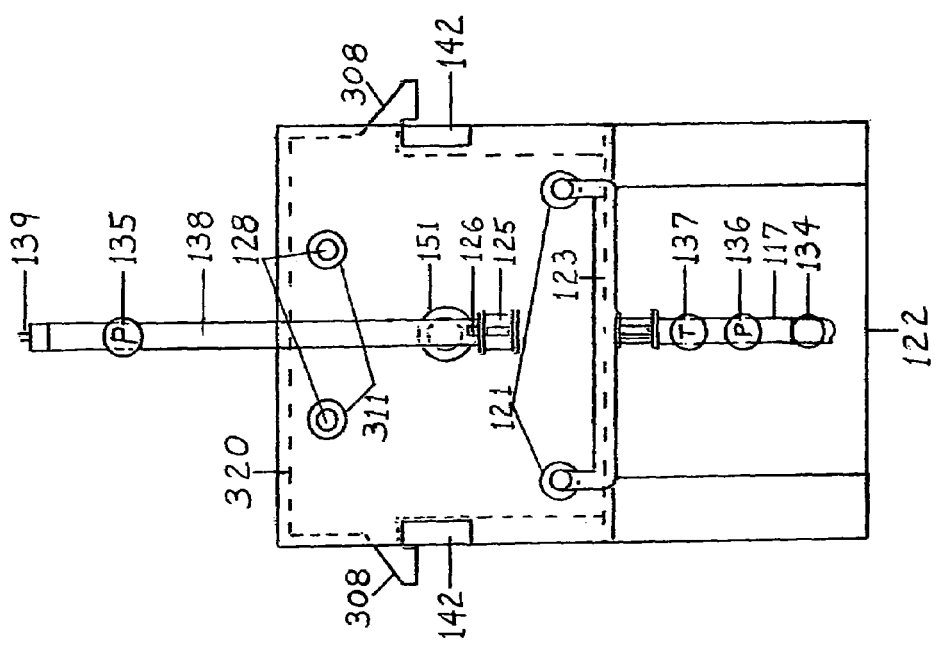

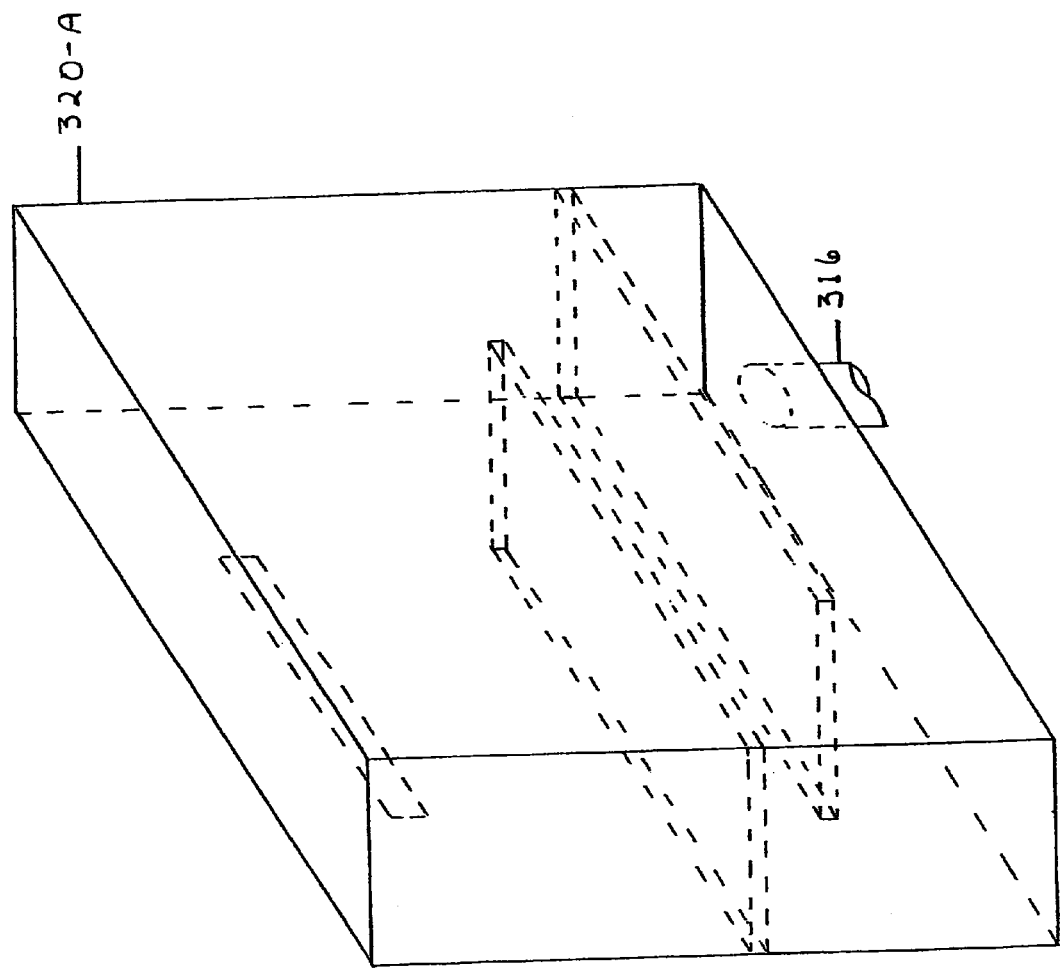

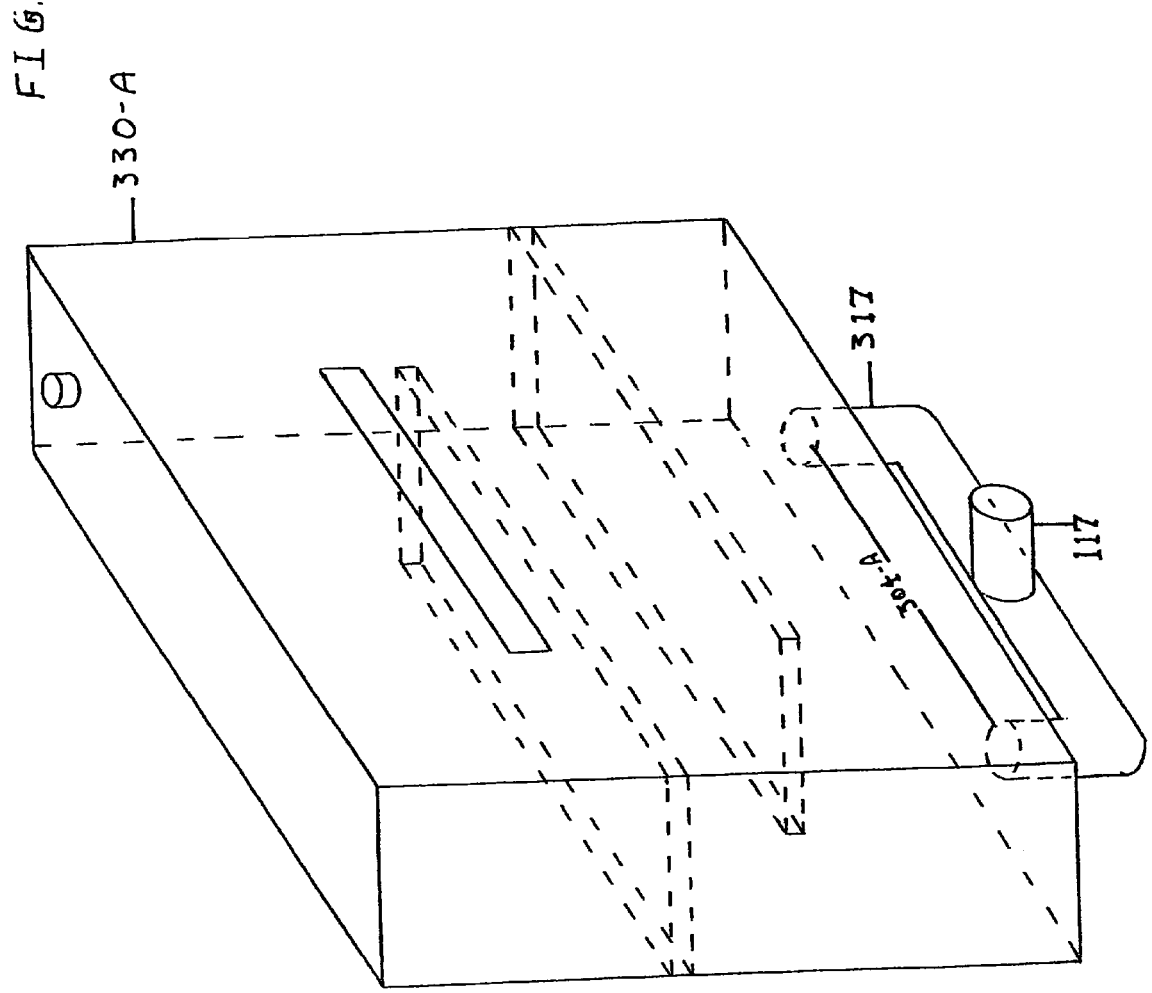

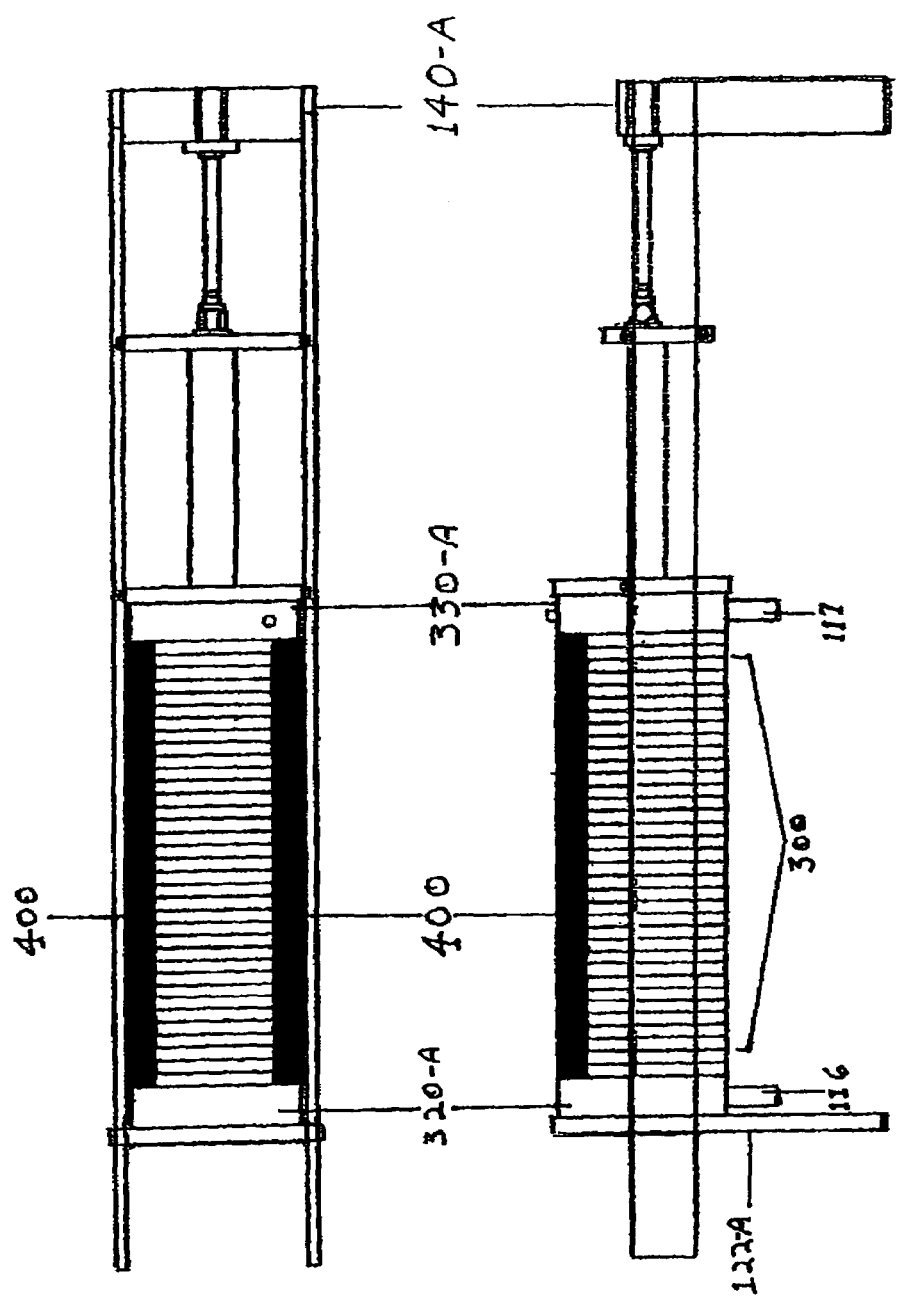

HIGH PRESSURE PROCESS AND APPARATUS FOR THE ELECTROCOAGULATIVE TREATMENT OF AQUEOUS AND VISCOUS FLUIDS

RELATED APPLICATIONS

This application claims the benefit of a provisional application having U.S. Ser. No. 60/425,358, filed on Nov. 11, 2002, which hereby is incorporated by reference in its entirety.

BACKGROUND OF THE INVENTION

1. Field of the Invention

The present invention relates to a high pressure method and apparatus for the treatment of aqueous or viscous fluids to destroy or otherwise render harmless undesirable living organisms in the fluids. A method and apparatus for removal of undesirable matter is also included.

2. Description of the Related Art

Various methods and apparatus are currently used for the treatment and/or removal of undesirable matter and organisms present in solution, in suspension or in a stable state of emulsion in aqueous fluids. Such methods typically suffer from drawbacks such as restricted flow and/or the inability to handle viscous materials such as sludge or slurries. Specific electrocoagulative treatment methods and apparatuses have been described in the literature. An example is U.S. Pat. No. 672,231 issued to Lacomme, which discloses the purification of water through the introduction of electricity, by a device applied to a section of a water main.

U.S. Pat. No. 3,969,245 issued to Ramirez discloses an electrocoagulation method and apparatus utilizing a cylindrical cell with concentrically positioned electrodes for electrolytically generating large quantities of gas bubbles while simultaneously flowing wastewater through the cell to form an embryo floc. The embryo floc subsequently attaches to the gas bubbles to achieve clarification by floatation. Ramirez vents the electrocoagulation cell to the atmosphere to avoid build up of pressure within the cell. One shortcoming of the Ramirez teaching is that current environmental standards dictate that fugitive air emissions are unacceptable and present complex permitting issues. Venting to atmosphere also limits applications in which an apparatus or process may be implemented due to hazardous materials venting to atmosphere and risk of explosion.

U.S. Pat. No. 5,928,493 issued to Morkovsky, et. al. relates to an electrocoagulation process and system for low pressure and low flow treatment of wastewater incorporating an agitated defoam tank utilized for allowing entrained gases to escape prior to entering a settling clarifier. The requirement of a defoam tank increases the overall footprint of the apparatus, adds additional plumbing and mixing components and vents off gases to atmosphere. This is unacceptable in many applications. The reactor cell housing of Morkovsky includes opposed grooved sides for retaining the electrode plates. This limits the application to low pressure conditions. Because of the spacing of the plates, when fluid velocities reach a critical point the differential pressure through the reactor cell is too great and the reactor cell is susceptible to leaking creating house keeping issues, exposure of possible hazardous materials to workers and the environment and the release of off gases to the environment. The Morkovsky reactor cell design is mechanically complex depending on "links" which are a means of connecting electrical power to the electrodes. These "links" must be inserted between the closely spaced electrode plates and tightened by means of nuts, screws and/or bolts and becomes maintenance intensive when exchanging the electrode plates or performing other maintenance.

German Patent Document DE 3641365 A1, issued to Klose discusses an electroflotation device for purification and treatment of polluted water by flowing the water over bundles of iron and aluminum electrode plates. Electroflotation is described as a combination of chemical and physical actions whereby iron and aluminum are sacrificed from the anodes and (as with chemical precipitation), utilized as an oxide for flocculation. Electrolytic action between anodes and cathodes release oxygen gases in the form of fine bubbles that enter into oxidation reduction reactions with substances in the water causing the precipitation of pollutants. Disinfection, metal removal and oil-water emulsion splitting occurs and contaminants are removed by vacuuming floated material from the surface and removing bottom sediments via the sloped bottom of the vessel. This device utilizes a rectangular tank, again open to the atmosphere, non-pressured and is not applicable to viscous fluids or sludges.

As illustrated by the background of the invention, attempts to develop methods and devices for the removal of contaminants from fluids have focused on low pressure electrolytic devices. It would be advantageous for an apparatus to accommodate high pressure and/or high flow during the treatment process of the sludge or other aqueous materials. It would be advantageous to cause undesirable matter to precipitate or co-precipitate from suspension and/or solution, destabilize suspended colloidal material, destabilize emulsions, or disrupt undesirable living organisms to treat fluid. It would be advantageous to use spacer plates to enclose and hold a variety of shaped electrodes while containing all fluids, electrical conduits and fluid conduits separately. It would also be advantageous for an apparatus to contain integral mixing chambers. A hydraulic mechanical closure means would also be advantageous. It would be advantageous to allow high pressure treatment of aqueous and/or viscous fluids while containing all fluids, fluid conduits, and electrical conduits within the boundaries of an apparatus isolating the fluids and conduits from the outside environment.

SUMMARY OF THE INVENTION

The present invention relates to an apparatus and method for treating aqueous and viscous fluids at high pressures including a pump for transferring various fluids, an influent pipe incorporating a pressure regulation device, a high pressure plate and frame electrocoagulation vessel, an effluent pipe in fluid communication with the electrocoagulation vessel incorporating a second pressure regulation device and a physical, mechanical, and/or organic separation means connected to the effluent pipe before or after the pressure regulation device such that the pressure of the aqueous and/or viscous fluid can be controlled through the physical, mechanical and/or organic separation means. Means for moving the plates together and apart preferably include mechanical systems, hydraulic systems and other similar systems known in the art. The influent pipe is in fluid communication with the pump and the electrocoagulation vessel. The current invention provides a method and apparatuses to process the fluids at increased flow rates and also can process fluids having high viscosities (biological sludge, soil slurries, oil field drilling fluids, etc.) in an environmentally safe, economical, user friendly, easily manufactured and easily maintained manner. The invention addresses undesirable matter and organisms in various states, such as in suspension, in solution or in a stable state of emulsion in aqueous and viscous fluids and sludge.

The high pressure plate and frame electrocoagulation vessel of a preferred embodiment of the present invention includes a plurality of recessed, gasketed, non-electrically conductive spacer plates with integral supports on the edges, hereafter referred to as spacer plates, that contain various shaped electrodes within the recessed boundaries of the spacer plates. The spacer plate holds and positions the electrodes in a specific orientation. The integral supports on the edges of the spacer plates accommodate resting on side rails of an elongated frame, preferably square or rectangular. The spacer plate stack can be arranged in various orientations, such as substantially horizontal or substantially vertical. In a preferred embodiment, the electrodes can act as a sacrificial material, including iron or aluminum, such that the electrode material will be sacrificed at the anodes in accordance with Faraday's Law when a voltage is applied to the electrodes. In an alternate preferred embodiment, it is advantageous to include electrodes of non-sacrificial material and/or electrodes coated with a non-sacrificial material. This can be particularly beneficial when the desired effect is oxidation and reduction or organism/organic destruction by the electromotive force present within the device. In a preferred embodiment, the electrodes are slotted, perforated, pierced, or crimped. The electrodes can be constructed of a porous, permeable or semi-permeable material. Other characteristics of electrodes known in the art can be used. Another preferred embodiment of the present invention includes an electrical conduit being external with integral attachment means for attachment to the electrodes for applications in a non-hazardous environment (i.e.: non-explosion proof). The electrical conduit, whether internal or external, includes conductive elements that allow a voltage to be applied to the fluid.

In one preferred embodiment, the spacer plates are constructed with a plurality of gasketed ports. These gasketed ports align with each other when a plurality of spacer plates are arranged beside each other such that the gasketed ports create a plurality of interconnected channels acting as conduits for fluid flow and for distribution of an applied voltage within the confines of an outer gasket located near the peripheral edge of the spacer plates. The aligned gaskets are referred to jointly as the peripheral gasket. The peripheral gasket of the spacer plates contains all fluids, bores and electrodes such that when the spacer plates are aligned for operation, each bore is substantially isolated from the outside environment. In a preferred embodiment, the spacer plates are aligned by applying closing or operating pressure to the spacers, preferably by hydraulic mechanical closure means. The integral hydraulic mechanical closure means allows for applying and releasing closure pressure on the plurality of spacer plates allowing the apparatus to be easily opened for maintenance and subsequently, easily closed with sufficient pressure to ensure containment and isolation of all fluids and bores within the confines of the apparatus. Another preferred embodiment includes external fluid conduits in fluid communication with an influent and/or effluent mixing chamber, also called a fall chamber, of the apparatus via an external manifold.

The spacer plates also include an electrically conductive material embedded or attached to the spacer plates. The electrically conductive material is preferably metallic discs, rods, inserts or the like. A preferred embodiment includes metal inserts that are connected or embedded in the spacer plate such that at least a portion of the metal inserts extend into the gasketed ports. In this manner, when a plurality of spacer plates are pressed together under pressure, an electrical conduit is formed when a voltage is applied and distributed through the interconnecting electrically conductive materials throughout the apparatus and contacting the selected enclosed electrodes. The electrical conduit in one internal embodiment is within the confines of the peripheral gasket and generally within the bore such that upon closure of the spacer plates the bore is substantially isolated from the outside environment. The electrical conduit of one preferred embodiment is internal and includes the terminal connector, electrodes and metal inserts with at least a portion being disposed within the bore.

A preferred embodiment of the electrocoagulation vessel includes a baffled influent and effluent mixing chamber at each end of the spacer plate stack for the addition and mixing of chemical reagents and/or flocculants. One or more mixing chambers can be placed between the head stock and the tail stock. Preferably, the mixing chamber generally has a height and width similar to those of the electrocoagulation plates. Depth of the mixing chamber is selected such that, with or without baffles, the depth is sufficient to allow for the mixing function of the mixing chamber. This also advantageously provides a means of fluid communication between fluid conduits formed within the apparatus, such as the bore formed by the interconnecting ports and a center chamber formed by the plurality of cavities of the spacer plates as well as the interconnecting piping allowing fluids to enter and exit the device. This arrangement has the advantage of allowing for influent and effluent plumbing to be located on one end of the device while the hydraulic mechanical closure means can be located on the opposite end of the device to provide closing or operating pressure applied to the spacer plate stack. The closing or operating pressure is advantageously greater than the influent pumping pressure such that closure is maintained on the plate stack containing all fluids within the confines of the peripheral gasket of the spacer plates. In a preferred embodiment, the influent mixing chamber is advantageously connected through the head stock of the supporting frame such that the head stock is in fluid communication with a riser pipe connected by a tee (T). The riser pipe is advantageously of higher elevation than the spacer plate stack and terminates by means of a pressure regulating device. The pressure regulating device can advantageously provide multiple functions when desired. The pressure regulating device collects gases that are present in an influent fluid so that gases can be released thereby preventing the gases from entering the electrocoagulation vessel where they could act to reduce the electrical conductivity of the fluid. Moreover, the pressure regulating device can operate as a passive relief valve that is set for a selected, maximum operating pressure such that the safe operating pressure of the electrocoagulation vessel is not exceeded therefore preventing the release of hazardous and/or non-hazardous fluids and/or material to the outside environment. In one preferred embodiment, the pressure regulating device is connected to an effluent conduit that returns any released fluids to the storage, equalization and/or collection tank or vessel containing the fluid before transfer to the electrocoagulation vessel. The two effluent conduits connect to the interconnecting effluent pipe that is in fluid communication with a separation means and connect to the separation means through the pressure regulating device. The pressure regulating device maintains pressure on the electrocoagulation vessel such that the evolution of gases resulting from electrolysis is inhibited until pressure on the fluid is released upon entry to the separation device. Advantageously, the effect of the pressure regulation is that the released gases that will evolve, such as O2 and H2, are maintained in solution where they are available for oxidation reduction reactions. The inhibition of gas evolution also prevents gas bubbles from reducing the electrical conductivity of the fluid as it flows through the electrocoagulation vessel. Additionally, the inhibition of gas evolution allows the evolved gases to be utilized for flotation clarification upon entry to the dissolved air/gas flotation chamber where liquid-liquid and/or liquid-solids separation occurs. When dissolved air/gas flotation is used as the separation means, a riser can be connected to the effluent conduit before the pressure regulation device by means of a Tee (T) as done with the influent riser before entry to the electrocoagulation vessel. The effluent riser can act as (1) a redundant passive relief valve that can be set at a selected operating pressure such that the safe operating pressure of the electrocoagulation vessel is not exceeded preventing the release of fluids and other materials to the outside environment; (2) to accumulate any gases that have evolved such that they can be released as not to allow large bubbles to enter into the flotation chamber where they may disrupt proper flotation mechanics, and/or, optionally, (3) a means for diverting fluid flow back to a collection/equalization vessel prior to entering the electrocoagulation vessel, for purposes of batch processing. Continuous processing can also advantageously incorporate the diverting means for overflow, upset or holding conditions. Other advantages will be apparent to those with ordinary skill in the art. A pressure release valve can be located at the point of entry to the separation device such that pressure is maintained within the electrocoagulation vessel 140 and the effluent pipe such that any evolved gases can be maintained in solution within the apparatus and the effluent pipe while non-evolved gases can be available for oxidation/reduction reactions with matter and/or organisms in solution, in suspension and/or in a stable state of emulsion in the aqueous and/or viscous fluid.

Examples of physical or mechanical separation device useful in various embodiments of the invention include dissolved air/gas flotation chambers, or other separators utilizing physical, mechanical or organic separation means. A preferred embodiment of the separation means includes a two-phase or three-phase decanting centrifuge, as used for dewatering of biological sludges or separating oil/water/solids or the like, a membrane concentration system, a membrane bioreactor as used for removal of dissolved organic species, a hydro cyclone as used for separating selected liquids-solids and liquids-liquids from soil slurries and oil field drilling fluids, a rotary or belt press as used for dewatering of biological sludges or a plate and frame filter press as utilized for dewatering of hazardous sludges.

Certain features have been broadly presented as to allow a better understanding of the detailed description that follows. It shall be understood by those skilled in the art that specific methods and structures described herein can be incorporated into differing designs that can be used to accomplish the same and/or similar objectives. It shall be understood that additional advantages, if not set forth specifically herein, will be readily apparent to those skilled in the art from the following detailed description and from the drawings.

Advantageously, the present invention provides a high pressure electrocoagulation apparatus that incorporates the four mechanisms of disinfection and in so doing satisfies the requirements of a process to further reduce pathogens (PFRP).

BRIEF DESCRIPTION OF THE DRAWINGS

The preceding features and objects of the present invention and additional objects not listed herein may be clearly understood by those skilled in the art from the detailed description which follows and the drawings.

FIGS. 2 and 3 are four sectional views of a preferred embodiment of the apparatus of the present invention

FIG. 19 is an isometric view of an influent mixing chamber of one embodiment of the apparatus.

FIG. 20 is an isometric view of an effluent mixing chamber of one embodiment of the apparatus.

FIG. 21 is a top and side view of one embodiment of the apparatus.

DESCRIPTION OF THE PREFERRED EMBODIMENT

One preferred embodiment of the invention includes a plate and frame apparatus utilizing recessed, gasketed, non-conductive spacer plates with enclosed, exchangeable electrodes of various designs that are suspended on a supporting, generally square, elongate frame in such a way as to allow the spacer plates with electrodes to be easily separated or opened. This ease of closure provides a simple means to exchange the electrodes or perform other maintenance after which the device is subsequently closed and pressured utilizing a hydraulic or screw type mechanical closure device or the like that can maintain sufficient closure/ operating pressure to seal the plurality of spacer plates with enclosed electrodes within the confines of the plurality of chambers formed therein such that the pressurized fluids are isolated within the apparatus. The apparatus of one preferred embodiment advantageously incorporates influent and effluent mixing chambers, which can contain injection ports for chemical reagents, in fluid communication with the influent or effluent pipes, internal or external to the confines of the spacer plates and interconnecting influent and effluent piping allowing fluids to enter and exit the apparatus. Multiple mechanical separation means in fluid communication with the apparatus are used to subsequently separate liquids from liquids, liquids from solids and/or for dewatering of the fluid.

Figure 1:
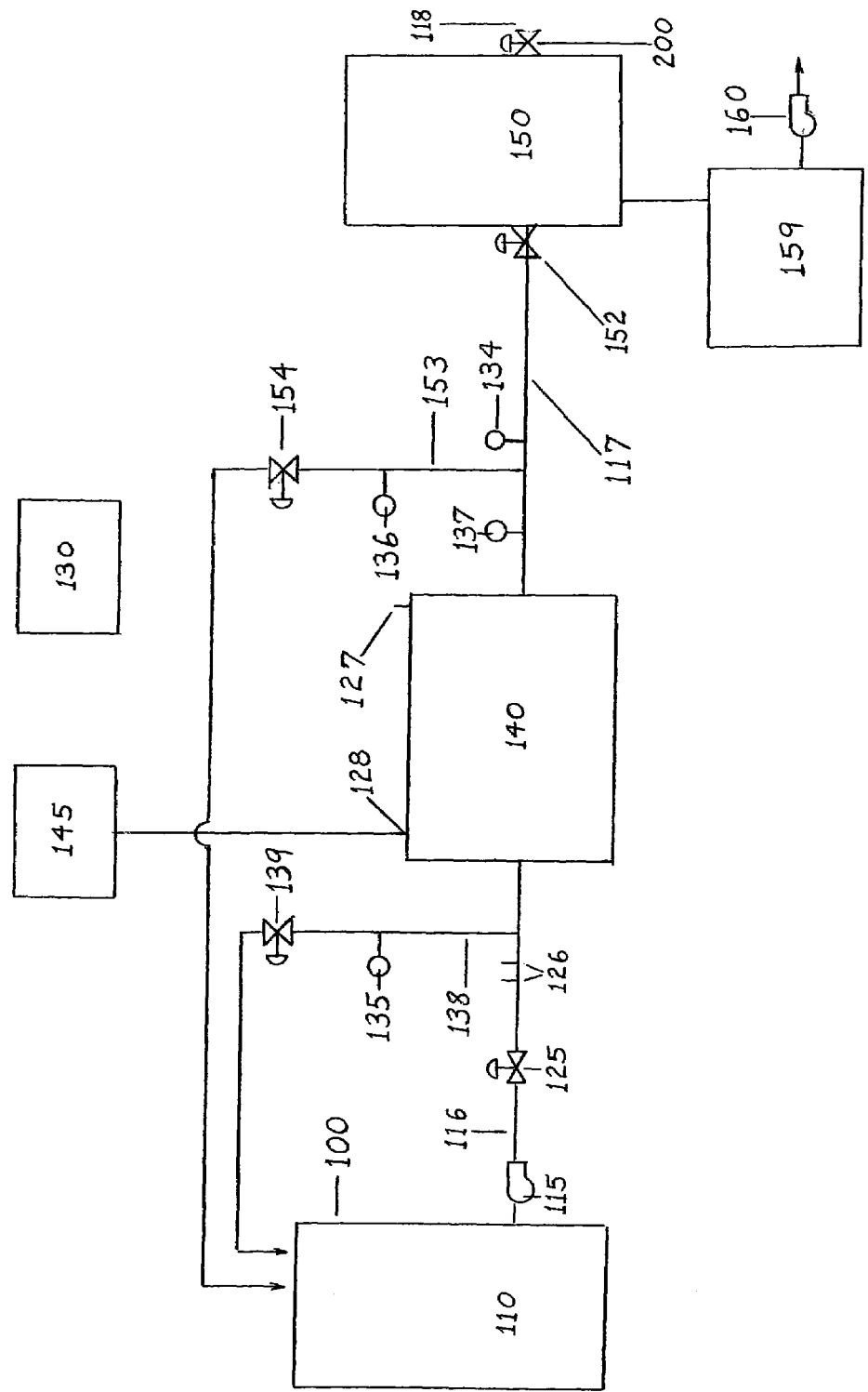
FIG. 1 is a schematic, block flow diagram of a preferred embodiment of the electrocoagulation method useful in the present invention.

Referring to FIG. 1, fluids 110 collected in tank 100 are pumped through an interconnecting influent pipe 116 by means of a pump 115 to the high pressure, plate frame electrocoagulation vessel 140. An actuated valve 125 is located in the interconnecting influent pipe 116 to contain fluids 110 in the collection tank 100 when the system is not in operation. Pump 115 is typically a centrifugal pump for low viscosity fluids and/or a progressive cavity pump for high viscosity fluids, slurries and/or sludge and is capable of variable flow rates and variable pressures (for example, 10 to 225 psi). A riser pipe 138 is connected to the interconnecting influent pipe 116 at a higher elevation than the electrocoagulation vessel 140 to collect any undissolved gas present in the fluid 110. These gases can be vented through pressure regulator valve 139 preventing any undissolved gas from entering the electrocoagulation vessel 140. As gases are resistive to electrical current and reduce the electrical conductivity of influent fluids 110 inhibiting treatment, it is advantageous to remove such gases. Pressure regulator valve 139 also provides passive pressure release in the event that unsafe pressures are encountered. Influent pressure of the fluid 110 is monitored by the influent pressure sensor 135 that transmits a variable signal proportional to the pressure to the controller 130. The controller can be a computerized PLC and/or other configured system utilizing analog and discrete inputs and outputs for data logging and activating automated devices. One or more influent injection ports 126 are connected to the interconnecting influent pipe 116 for the addition of chemical reagents through the influent injection port 126 into the interconnecting influent pipe 116, for desired oxidation reduction reactions, and for the addition of pressurized air for evacuating fluids from the electrocoagulation vessel 140 when maintenance is required.

Figure 4:
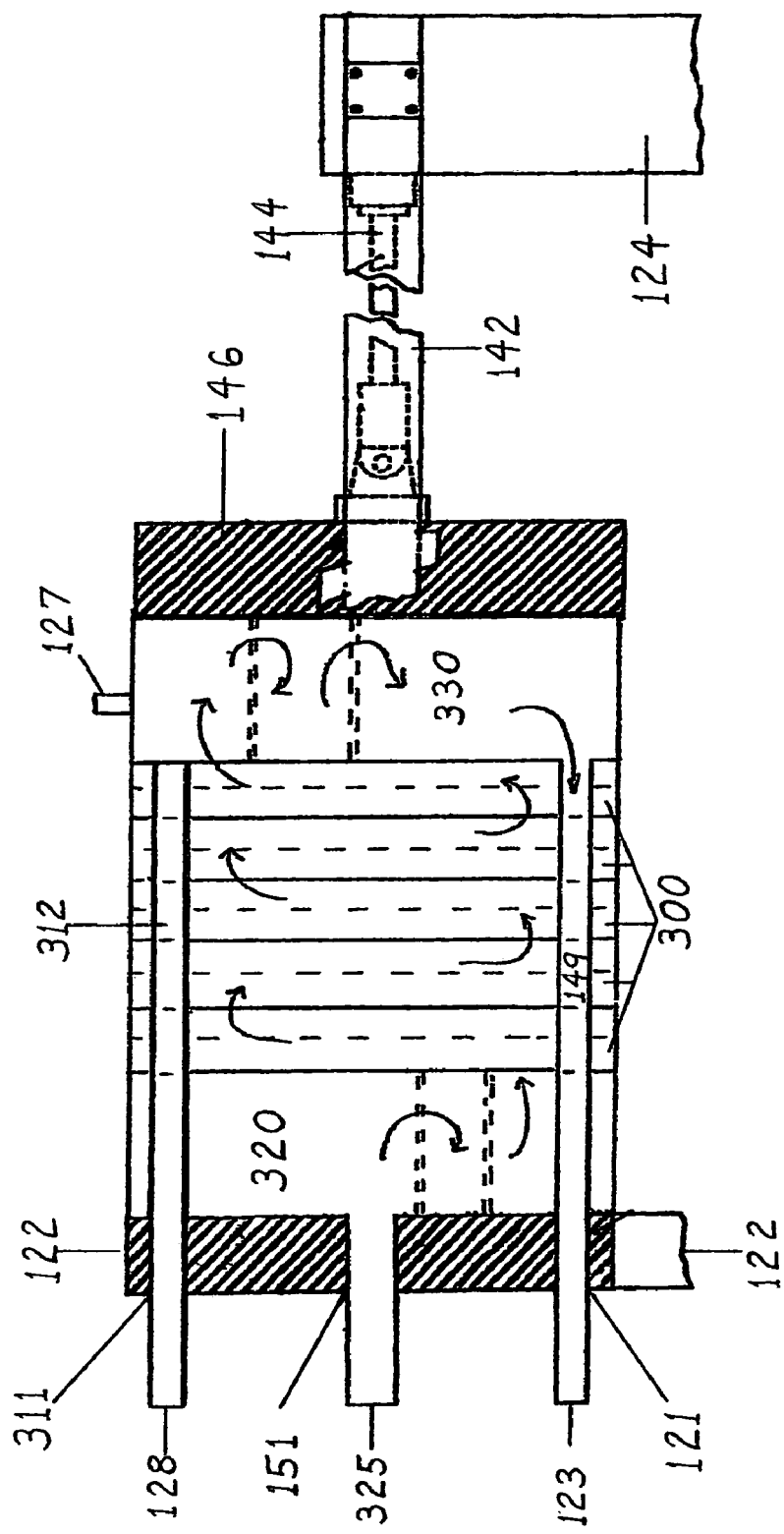
FIG. 4 is a horizontal cross section of the side view of a preferred embodiment of the apparatus of the present invention.

The electrocoagulation vessel 140 is connected to a power supply 145 that provides an applied voltage to the apparatus. The applied voltage can be an alternating, direct and/or a pulsed current. The following examples describe the applied voltage as a direct current with voltage applied to the terminal connections 128 of the electrocoagulation vessel 140. As the pressured fluid 110 flows through the electrocoagulation vessel 140 until it flows out of the vessel as processed fluid, various reactions occur as described in co-pending U.S. patent application Ser. No. 60/244,615, hereby incorporated by reference, and in the forthcoming details. As the pressurized fluids 110 exit the electrocoagulation vessel 140, a preferred but not essential step is the injection of a flocculent aid via mixing chamber injection port 127 to assist with subsequent separation. Pressurized fluids 110 exit the electrocoagulation vessel 140 by means of the interconnecting effluent pipe 117 with attached temperature sensor 137 that monitors the temperature of the effluent fluids 110 and transmits a variable signal proportional to the temperature to the controller 130. The interconnecting effluent pipe 117 is connected to an actuated pressure regulator valve 154 by riser pipe 153 such that the elevation of the riser pipe 153 is higher than both the electrocoagulation vessel 140 and the subsequent separation means 150. Undissolved gases present in the pressurized fluid 110 can be periodically purged from the system through pressure regulator valve 154 to ensure that no undissolved gases enter the subsequent separation means 150. The pressure regulator valve 154 also provides passive pressure relief in the event that unsafe pressures are encountered. Pressure of the effluent pressurized fluid 110 is monitored by the effluent pressure sensor 136 that transmits a variable signal proportional to effluent pressure to the controller 130. In a preferred embodiment, the pH of the effluent pressurized fluid 110 is monitored by pH sensor 134 that transmits a variable signal proportional to the pH to the controller 130. The pressurized fluid 110 can enter a variety of physical, mechanical and/or organic separation means 150 through pressure regulator valve 152 and pressure on the fluid 110 is dissipated as separation occurs by flotation, sedimentation, filtration and/or centrifugal force depending on the mechanism of the physical, mechanical and/or organic separation means 150. Treated fluid 110 exits the separation means 150 by means of a fluid conduit or pipe 118 connected to the separation means 150 by actuated valve 200. Separated materials removed from the fluids 110 are collected in a holding vessel 159 for further disposition by a transfer pump 160. Separation means can include a two phase and/or three phase decanting centrifuge as utilized for the disinfection/destruction of pathogens and subsequent dewatering of biological sludge, liquefied manure and/or the separation of oil, water and solids. Separation means can alternately include a membrane concentration system and/or membrane bioreactor as utilized for concentrating and/or elimination of organic substances. Hydro cyclones as also useful, in particular, for soil slurries and oilfield drilling fluids. A rotary and/or belt press can be utilized for dewatering biological sludge and/or a plate and frame filter press can be utilized for dewatering of hazardous sludge FIG. 2 and FIG. 3 show four elevated views of a preferred embodiment of the high pressure plate and frame electrocoagulation vessel 140 of the present invention. Together with FIG. 4, a horizontal cross section through the Z-axis viewing from the front of the head stock 122, details of the structure of the supporting frame become apparent to those skilled in the art. The supporting frame of the preferred apparatus comprises a rectangular, solid steel head stock 122 and tail stock 124 welded to two, heavy duty rectangular steel tubing side rails 142 perpendicular to head stock 122 and tail stock 124 forming an elongate frame above grade for supporting, positioning and maintaining closure pressure on a plurality of electrocoagulation spacer plates 300, hereafter referred to as ESP's. The side rails 142 can be in any placement of position, including bottom side and/or top side. The side rails can be connected to the head stock and tail stock by any means, including integral formation with the head stock and tail stock. In certain embodiments, it is advantageous to have more than one side rail on one side. The ESP's 300 in this embodiment ride on the top of the side rails 142 of the supporting frame and can be separated or opened for accessing internal components. The ESP's can subsequently be closed and pressured by the hydraulic closure mechanism 144 that is integrally attached to the tail stock 124 and the push plate 146. Other means for moving the plates together can be used in place of the hydraulic closure mechanism. The push plate 146 also rides on top of the side rails 142 and is held in a perpendicular position by two rollers 148. In one embodiment, a spool piece 147 is included to allow for future expansion, different configurations of the apparatus or incorporation of multiple power supplies by segregating groups of ESP's 300.

The head stock 122 of the preferred apparatus is constructed of solid steel providing a supporting leg for the apparatus and a means for attachment of the two side rails 142. Electrical contact terminals 128 are inserted through headstock ports 311 near the top of the head stock 122 providing a means for the applied voltage supplied by the power supply 145 to contact internal components. The electrical contact terminals 128 utilize standard explosion proof conduit-junctions that are familiar to those skilled in the art. One or more through-wall ports 121 are located near the bottom corners of the head stock 122 and are in fluid communication with internal, effluent conduits 149 providing a means for fluids 110 to exit the apparatus. Although only two effluent ports 121 are shown, more can be utilized determined by the application. The two effluent ports 121 demonstrated in the figure are connected to an effluent manifold 123 that is in fluid communication with the interconnecting effluent pipe 117. Effluent temperature sensor 137, effluent pressure sensor 136, and pH sensor 134 are located in the interconnecting effluent pipe 117 to monitor temperature, pressure and pH, respectively, of the pressurized fluid 110 as it exits the apparatus. The various sensors transmit variable signals proportional to the temperature, pressure or pH respectively to the controller 130. The interconnecting influent pipe 116 is in fluid communication with the influent feed pump 115 (FIG. 1) and incorporates actuated valve 125 used for segregating the system from the collection tank 100 and allowing the apparatus to be depressurized by opening pressure regulator valve 139 and/or pressure regulator valves 154 and 152 (FIG. 1). Various other means for regulating pressure in the electrocoagulation vessel can also be used. Integral with the influent interconnecting pipe 116 are one or more influent injection ports 126 for the addition of chemical reagents that can be utilized for pH control, oxidation reduction and/or other desired reactions, and air for evacuating fluids from the apparatus such as prior to or during depressurization and subsequent opening for inspection and maintenances. A riser pipe 138 is connected to the influent interconnecting pipe 116 behind the influent injection ports 126 and before the influent conduit 325 through the influent head stock 122 providing a means of collecting any gases not in solution and purging the gases to the collection tank 100 to avoid inclusion of the gases in the influent pressurized fluid 110 avoiding a reduction of electrical conductivity in the influent fluid 110. Integral with the riser pipe 138 are pressure regulator valve 139 and influent pressure sensor 135 that monitors influent fluid 110 pressure and transmits a variable signal proportional to the pressure to the controller 130. Pressure regulator valve 139 also provides passive pressure relief by receiving a signal from the controller 130 to open when a pre-set, limiting pressure is detected thereby avoiding an unsafe condition.

The tail stock 124, like the head stock 122, also provides a support leg for the apparatus and a means of welded attachment for the two side rails 142. The tail stock 124 also provides a means of supporting the integrally attached hydraulic closure mechanism 144 for opening, closing and maintaining pressure on the closed stack of ESP's 300. The hydraulic closure mechanism 144 is an air operated closure mechanism lockable in the closed position that is capable of maintaining sufficient closure pressure to allow influent pumping and operating pressure of the fluid 110 at 10 to 225 psi, one preferred example being at about 110 psi. Closure pressure is in direct correlation to the cross sectional surface area of the ESP 300 stack and will vary with the size of the preferred apparatus. All hydraulic components and a local control panel 220 are integral with and enclosed within the tail stock 124 and include pneumatic and hydraulic pressure relief bypass means (not shown) to avoid damage to the apparatus in a malfunction condition. All integral, internal hydraulic components, air headers, pumps, air regulators etc. are accessible to the operator through an access door 143 in the tail stock 124.

Figure 6:
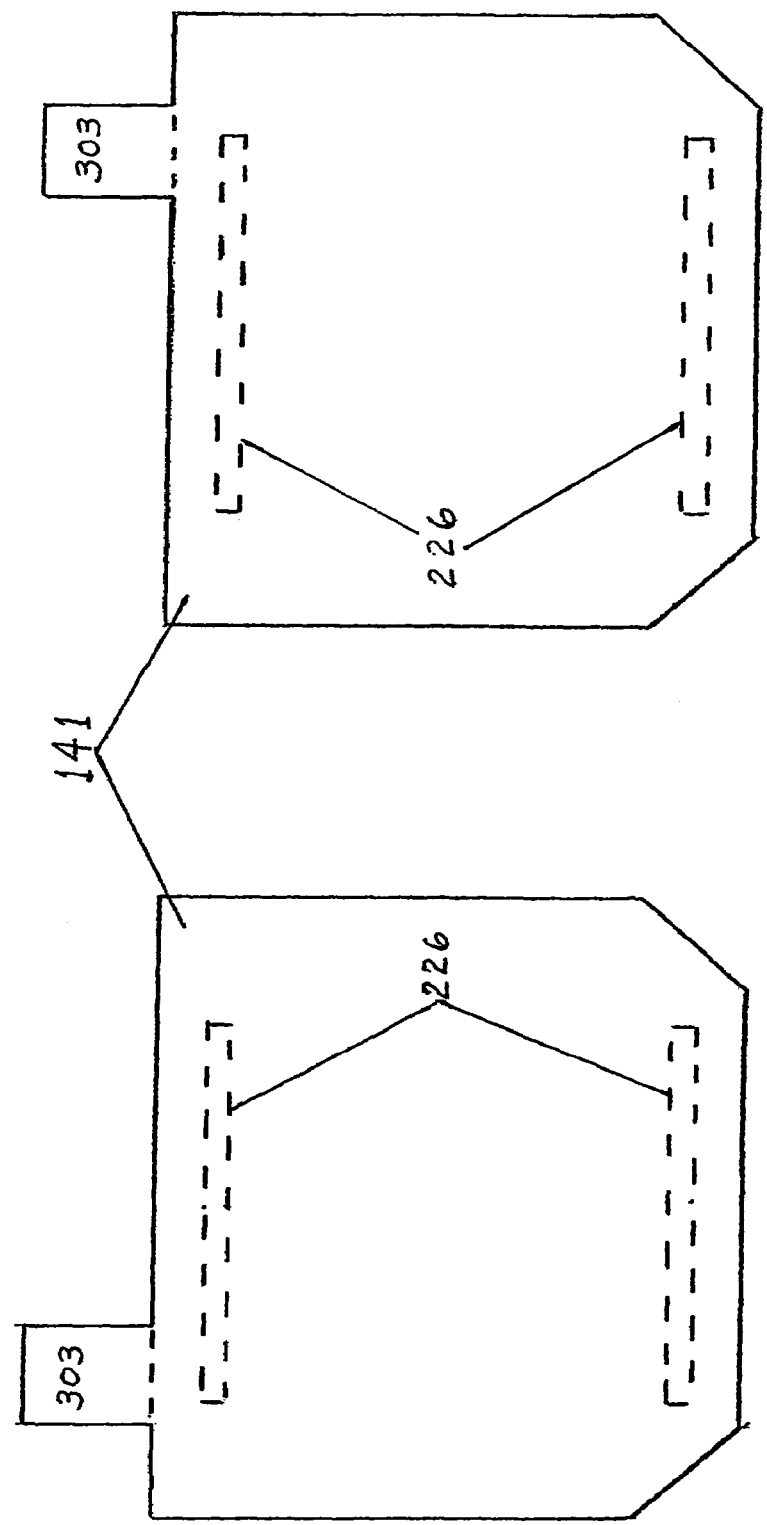
FIG. 6 is a view of one embodiment of an electrode of the apparatus.
Figure 16:
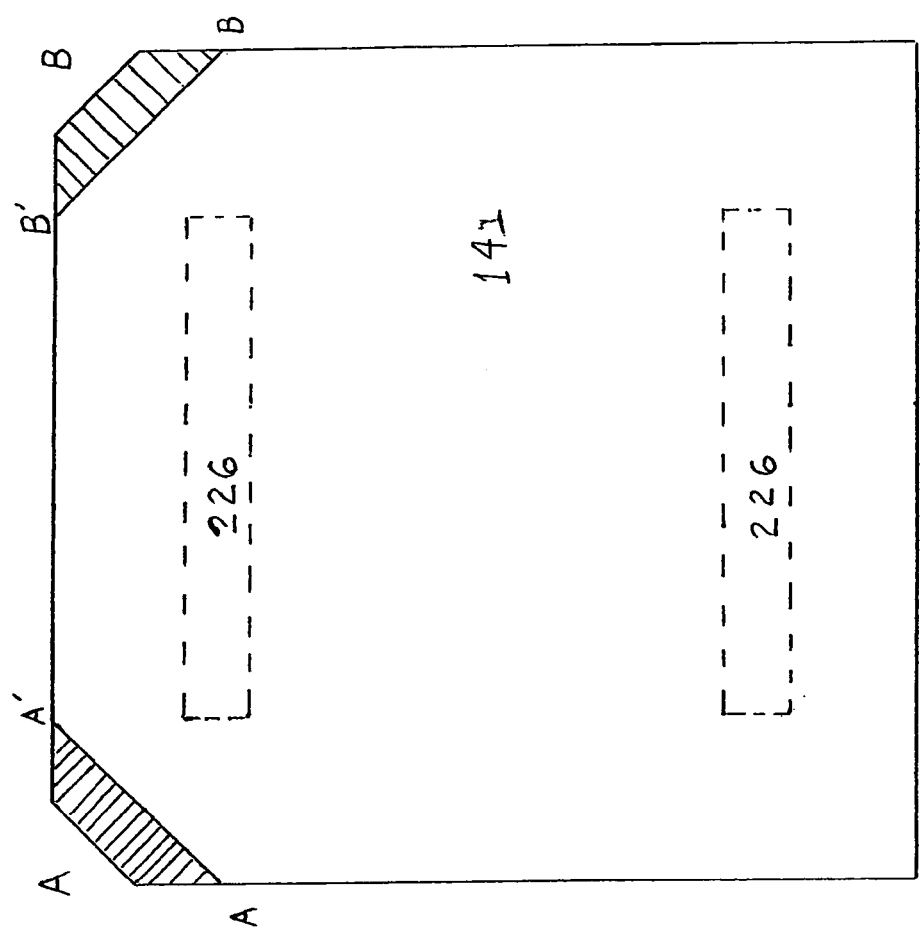
FIG. 16 is a view of an offset, hexagonal electrode of one embodiment of the apparatus.

FIGS. 9, 10, 11 and 17 show front and side views of ESP's 300 of the preferred apparatus and, together with FIGS. 12, 13, 14 and 15, show an isometric and cross-sectional view of a plurality of ESP's shown in a closed position without the supporting frame. FIGS. 6 and 16 show views of electrodes 141 of the preferred apparatus. The mechanism of fluid transport through the apparatus and distribution of the applied voltage throughout the apparatus will become apparent to those skilled in the art.

Figure 12:
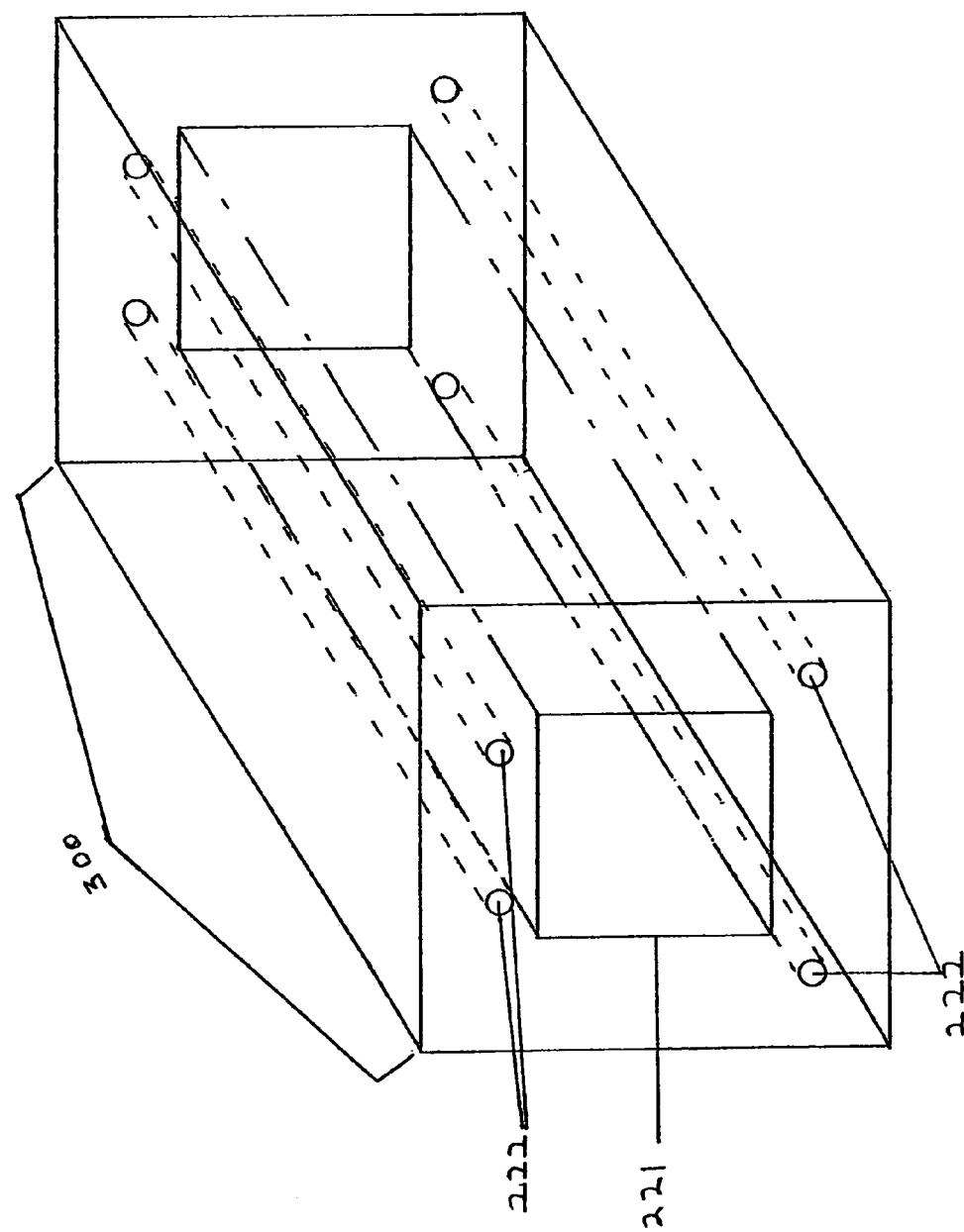
FIG. 12 is an isometric view of a plurality of electrocoagulation spacer plates of one embodiment of the apparatus shown in a closed position without the supporting frame.
Figure 13:
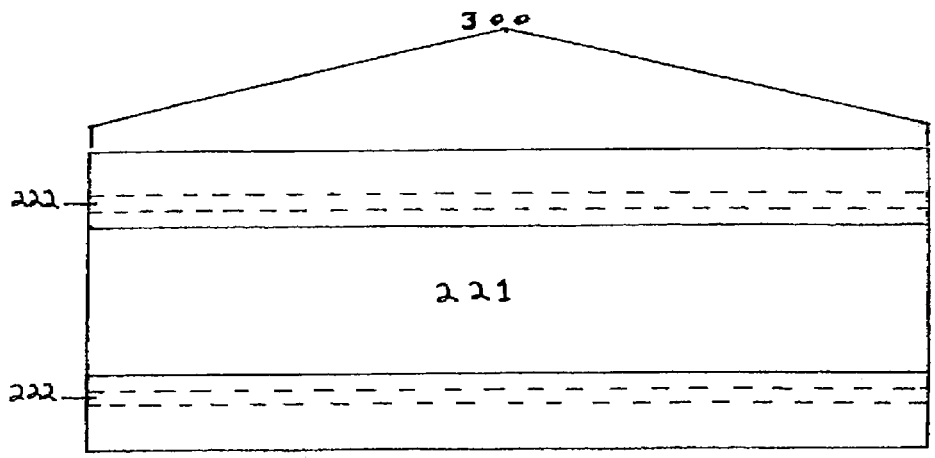
FIGS. 13, 14 and 15 are cross sectional views of FIG. 12.
Figure 14:
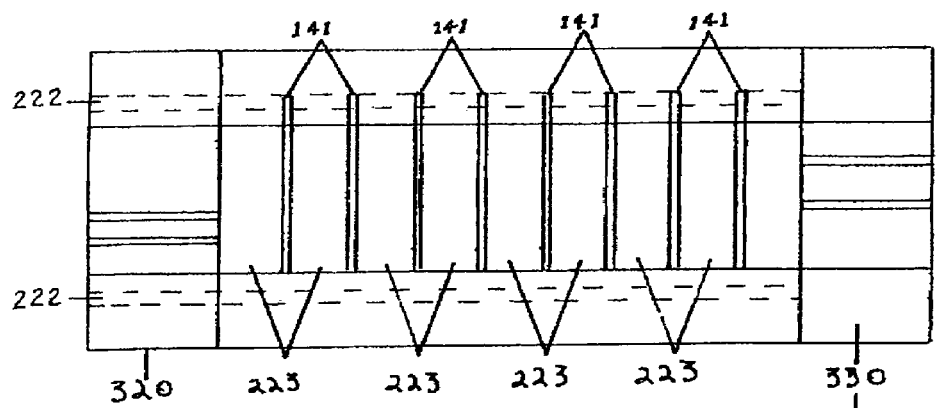
Figure 15:
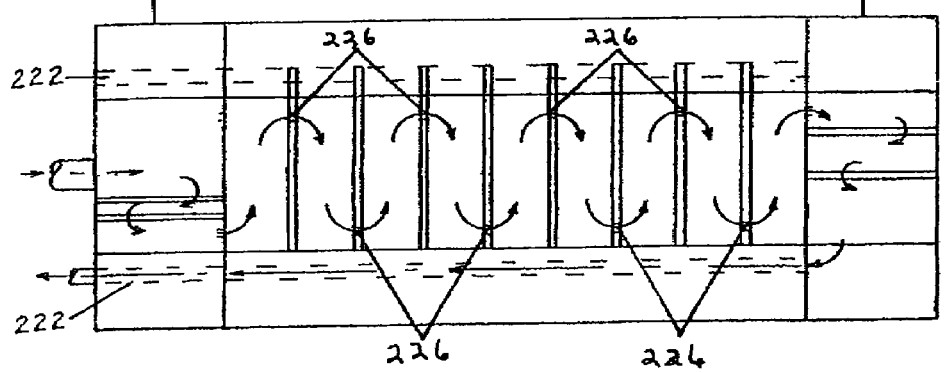

Electrocoagulation spacer plates 300 are advantageously flat, recessed, gasketed, ported devices constructed of non-electrically conductive materials including an internal cavity 305 for supporting and containing various shaped electrodes 141 within confined boundaries such that when a plurality of like devices is stacked together, and an internal, elongated cavity chamber 221 with a plurality of bores 222, preferably parallel and tubular, are isolated within. These bores 222 are available for use as a fluid conduit or to establish an electrical conduit or the like. ESP's 300 are typically square and/or offset hexagonally shaped. FIG. 12 is an isometric view of a plurality of ESP's 300 stacked together without a supporting frame or electrodes 141 showing the internal elongated cavity chamber 221 and surrounding parallel bores 222 within. When flat, ported electrodes 141 are enclosed within the recessed boundaries 224 of the closed ESP's 300, a plurality of perpendicular chambers 223 is isolated within the internal, elongated cavity chamber 221 such that fluids 110 can flow through a path established by the shape and location of an electrode opening 226 in the flat, enclosed electrodes 141. In this illustration the preferred shape and location of the electrode opening 226 are rectangular ports located at alternating ends therefore dictating a meandering or sinuous path. The dotted lines of FIG. 6 indicate the preferred embodiment of alternating the locations of the electrode opening 226, only one opening being used per electrode, to establish a circuitous path. Other paths can be used as well. Multiple electrode openings may be used to form various paths. The electrode openings can be circular, rectangular, or the like and can advantageously be located at alternating tops and bottoms of electrodes 141, at alternating right and left sides of electrodes 141 and/or any combination of the locations as to advantageously develop a meandering or sinuous flow pattern and/or a spiral or conical flow pattern. When an applied voltage is connected to the terminal connections 128 of the apparatus and distributed throughout the apparatus such that alternating positive (+) and negative (−) electric potentials are realized by the enclosed electrodes 141 while fluids 110 are flowing through the sinuous path, an electric current flows from electrode 141 to electrode 141 and therefore through the pressurized fluid 110 circulating through the apparatus.

Electrodes 141 can be of a variety of configurations with one preferred embodiment including a design such that the electrodes 141 are cut to match the spacer plate 300 pattern such that the electrodes 141, also called electrode plates, are supported by the side rails 142.

Figure 9:
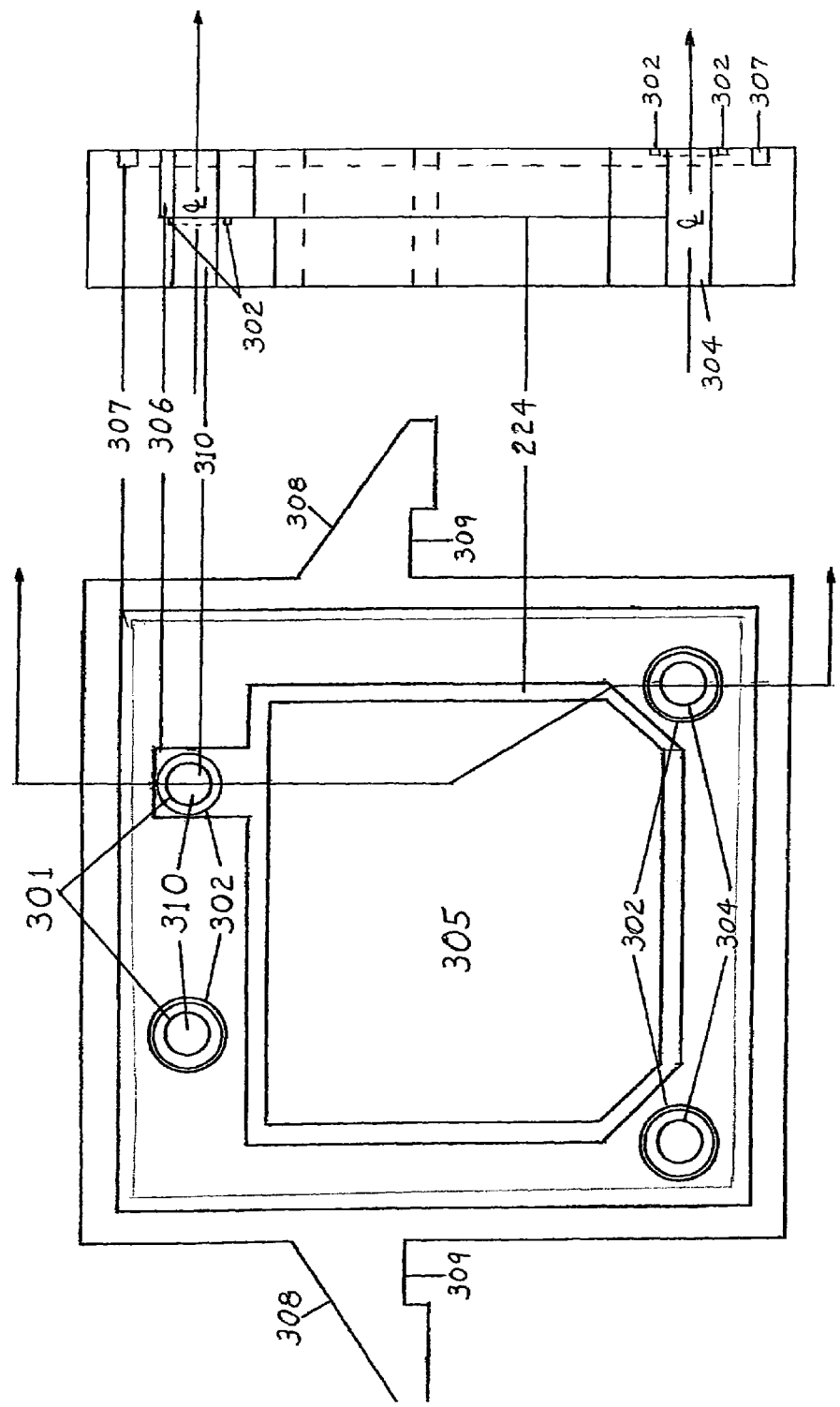
FIG. 9 is a front and side view of a right single recessed electrocoagulation spacer plate of one embodiment of the preferred apparatus.
Figure 10:
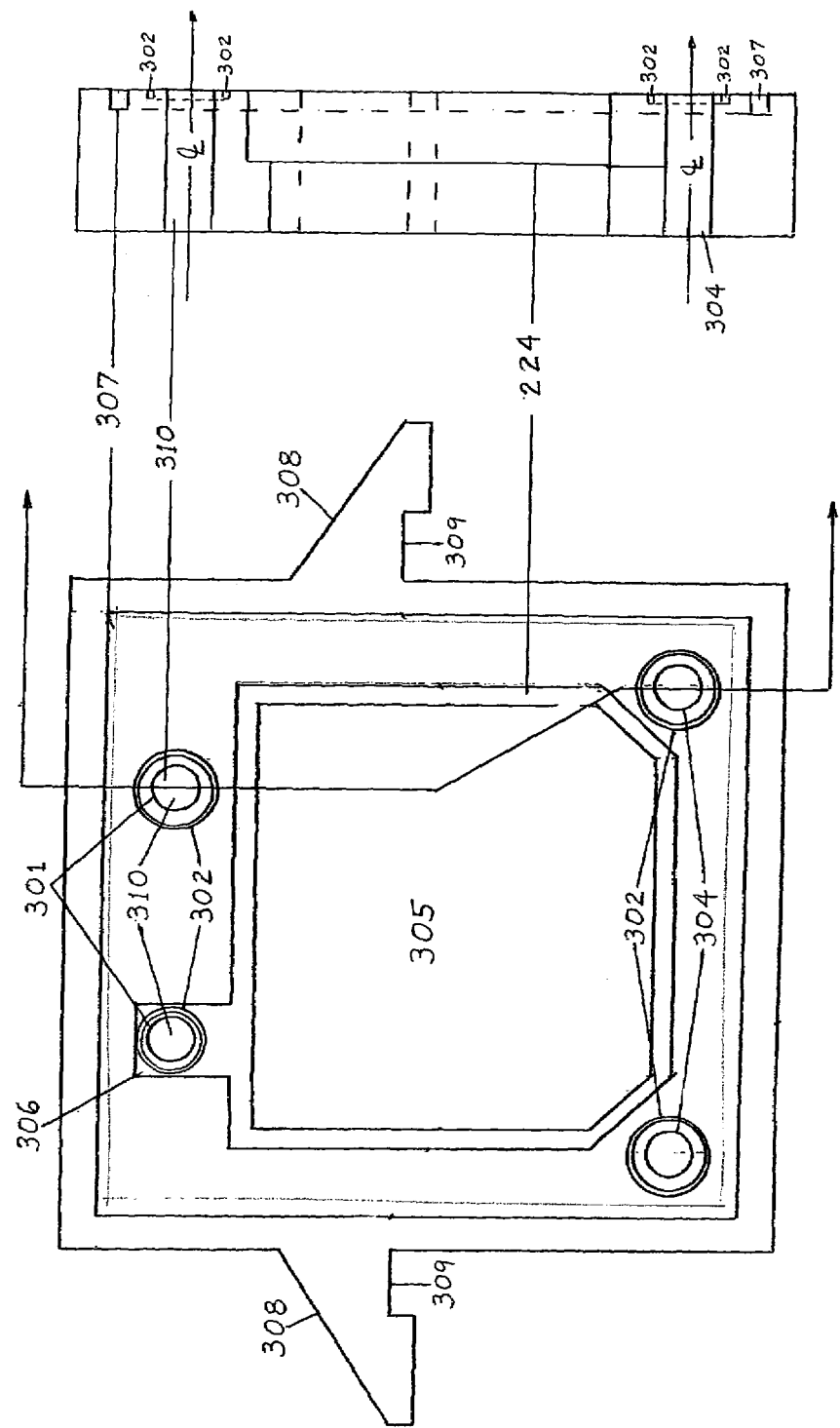
FIG. 10 is a front and side view of a left single recessed electrocoagulation spacer plate of one embodiment of the preferred apparatus.
Figure 11:
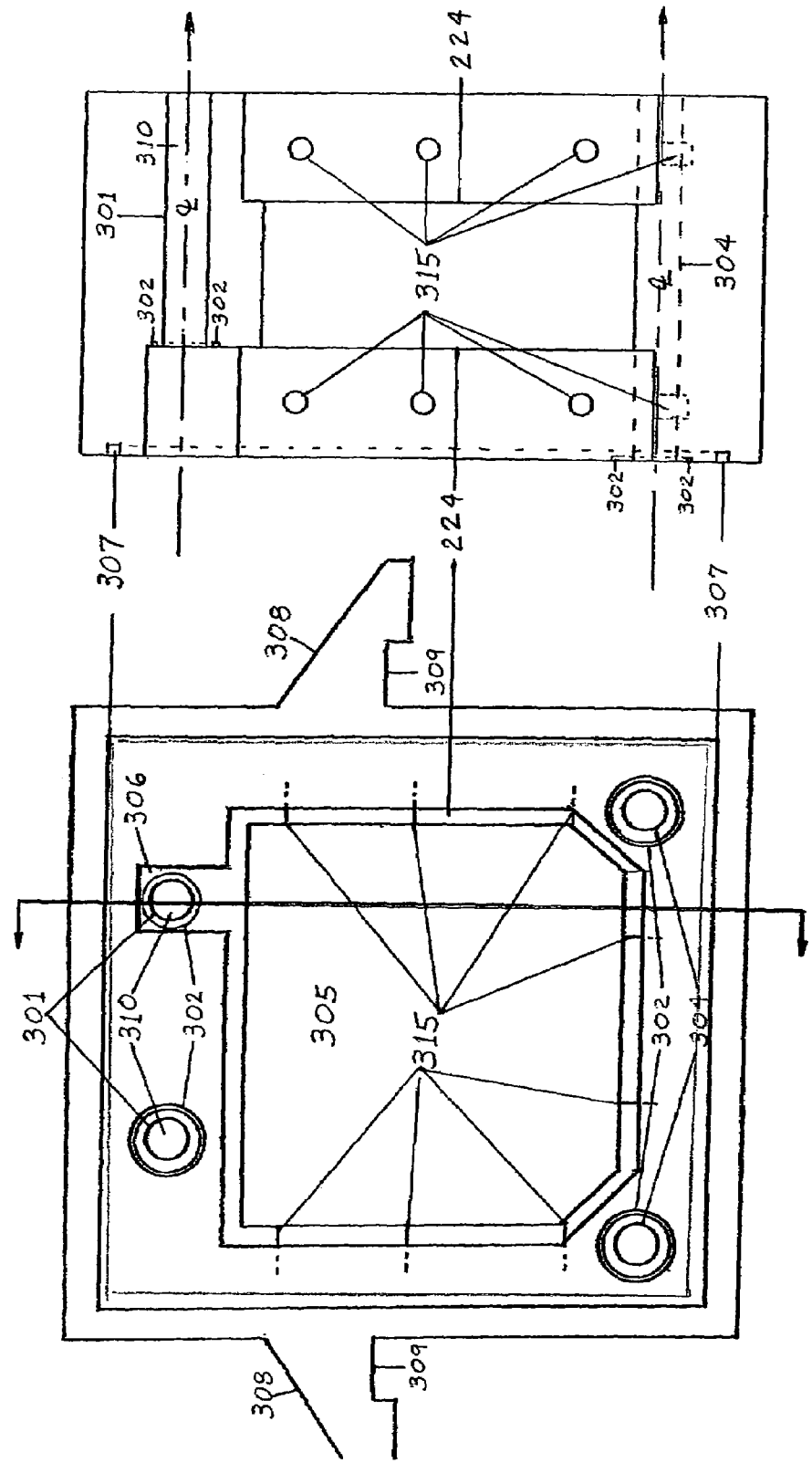
FIG. 11 is a front and side view of a double recessed electrocoagulation spacer plate of one embodiment of the preferred apparatus.

One means of distributing the applied voltage throughout the apparatus is accomplished by interconnecting, metallic inserts 310 that are embedded and/or inserted in the upper, gasketed ports 301 of the ESP's 300 such that when a plurality of ESP's 300 are closed and held together the metallic inserts 310 contact each other, the power contact 303 of selected electrodes 141, and the electrical terminal connections 128 located at the head stock 122, thereby defining the electrical conduit 312 (FIG. 4) and a complete circuit for distribution of electrical power. The gasketed ports 301 are ports or holes through the ESPs 300. Port gaskets 302 are connected to or embedded in the ESP in a close proximity to the port and in a manner that surrounds the port. In this fashion, when the ESPs are in a closed position, the gasket forms a seal with the ESP adjacent to the port gasket. The port gaskets 302 are preferably on a front face 404 and a back face 406 of the ESP. In one embodiment, the port gaskets on the front and back faces do not align with each other. In this manner, mechanical strength is the ESP is maximized. All gasketed ports 301 and fluid ports 304 within the body of the ESP's 300 are individually contained by port gaskets 302 that are inserted into grooved recesses 402 such as to hold the port gaskets 302 in place and seal the gasketed ports 301 and fluid ports 304 containing and isolating same from fluid intrusion as with gasketed ports 301 when for use as an electrical port and/or fluid extrusion as with the case of the lower fluid ports 304 used for effluent fluid conduits 149 (FIG. 4) formed when a plurality of ESP's are closed and held together. A peripheral gasket 307 is positioned within a like-recessed groove located around the outer perimeter of the ESP's 300 thereby containing all internal cavities 305, all gasketed ports 301 used for electrical purposes, metallic inserts 310 used as part of the electrical conduit, all gasketed ports used as fluid ports 304, and pressured fluids 110 within the confines of the peripheral gasket 307 and ESP's 300 isolating same from the outside environment. ESP's can be single recessed (FIG. 9 and FIG. 10) meaning that the internal recessed boundary support 224 with rectangular recession 306 for location of selected electrode power contact 303, is located on only one surface for enclosing and positioning of one electrode 141 and/or double recessed FIG. 11 and meaning that the ESP's 300 contain internal recessed boundary supports 224 on both surfaces for enclosing and positioning of two electrodes 141. A double recessed ESP 300 can be utilized with one powered electrode 141, using the second recessed boundary support 224 to position a non-powered baffle surface creating a longer fluid path within the apparatus for (1) increasing the dwell time (reaction time) that the fluid 110 being treated is exposed to the electromotive force present within the apparatus and (2) increasing the distance and therefore the electrical resistivity between powered electrodes 141 requiring a higher applied voltage resulting in increased electrolysis and increased release of oxygen (O2) and hydroxyl (OH—) ions available in solution for oxidation reduction reactions. When a non-powered baffle plate is incorporated in the second recessed boundary support 224 of a double recessed ESP 300, the baffle plate is held in position by pins 315 or the like, inserted advantageously parallel to the outer surface of the baffle plate and perpendicular to the recessed boundary support 224 edge. The extended, rectangular recession 306 that is integral with the internal recessed boundary support 224 for contacting selected electrodes 141 can be located in the right position as shown in FIG. 9 or in the left position as show in FIG. 10 to receive the electrode power contact 303 of selected electrodes 141. ESP's 300 rest vertically within the two side rails 142 of the supporting frame by means of a slotted, integral support 308 using the rectangular shaped spacer plate slot 309 for positioning and alignment the spacer plates on the side rails 142.

Electrodes 141 and 142 are described in approximately perpendicular orientation within the confines of the elongated cavity chamber 221 formed within the apparatus. Electrodes 141 and 142 can also be arranged parallel to the elongated cavity chamber 221 or other orientation depending on the objectives of treatment. The electrodes 141 and 142 can be an irradiation transmitter or other means of introducing alternative forms of energy (i.e.; gamma ray, infrared, ultrasound, ultraviolet light, or the like) that can be beneficial for various treatment methodologies. Optionally, the electrodes can also include a slotted, integral support for positioning and alignment the electrodes on the side rails 142.

Figure 7:
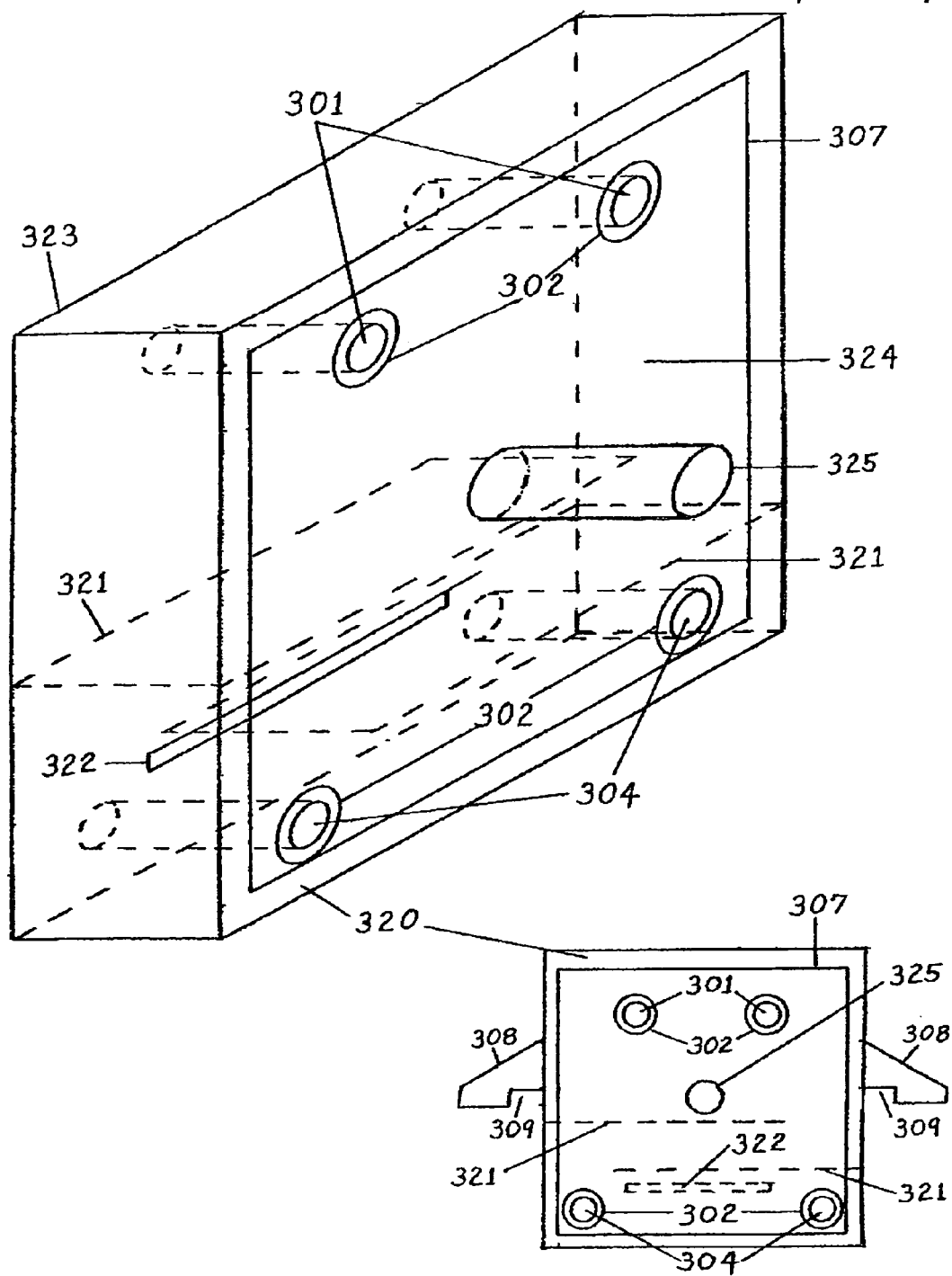
FIG. 7 is an isometric and front view of the influent mixing chamber of one embodiment of the apparatus.

FIG. 7 is an isometric and front view of an influent mixing chamber 320 (the isometric view omits integral supports) that can be attached to the head stock 122. It is comprised of many like features in that there are two upper gasketed ports 301 used to contain metallic inserts 310 and two, lower gasketed fluid ports 304 used for fluid transport, but this device does not contain and position any electrodes 141. The influent mixing chamber 320 has a centrally located influent conduit 325 that protrudes through the influent port 151 in the head stock 122 and is in fluid communication with the interconnecting influent pipe 116 thereby allowing pressurized fluids 110 to enter the apparatus. It is a hollow structure with internal baffles 321 oriented such that the fluid 110 direction is reversed when traversing through the chamber, agitating the fluid 110 to mix any chemical reagents optionally injected via the influent injection ports 126 in the interconnecting influent pipe 116. There is a rectangular port 322 located at the bottom of the back wall 323 to allow the pressurized fluid 110 to flow through. All gasketed ports 301 and fluid ports 304 extend from the front wall 324 to the back wall 323 isolating the tubular ports from the internal chamber between. The influent mixing chamber 320 is constructed of non-electrically conductive materials and isolates electrical contact with the head stock 122 and side rails 142 like ESP's 300.

Figure 8:
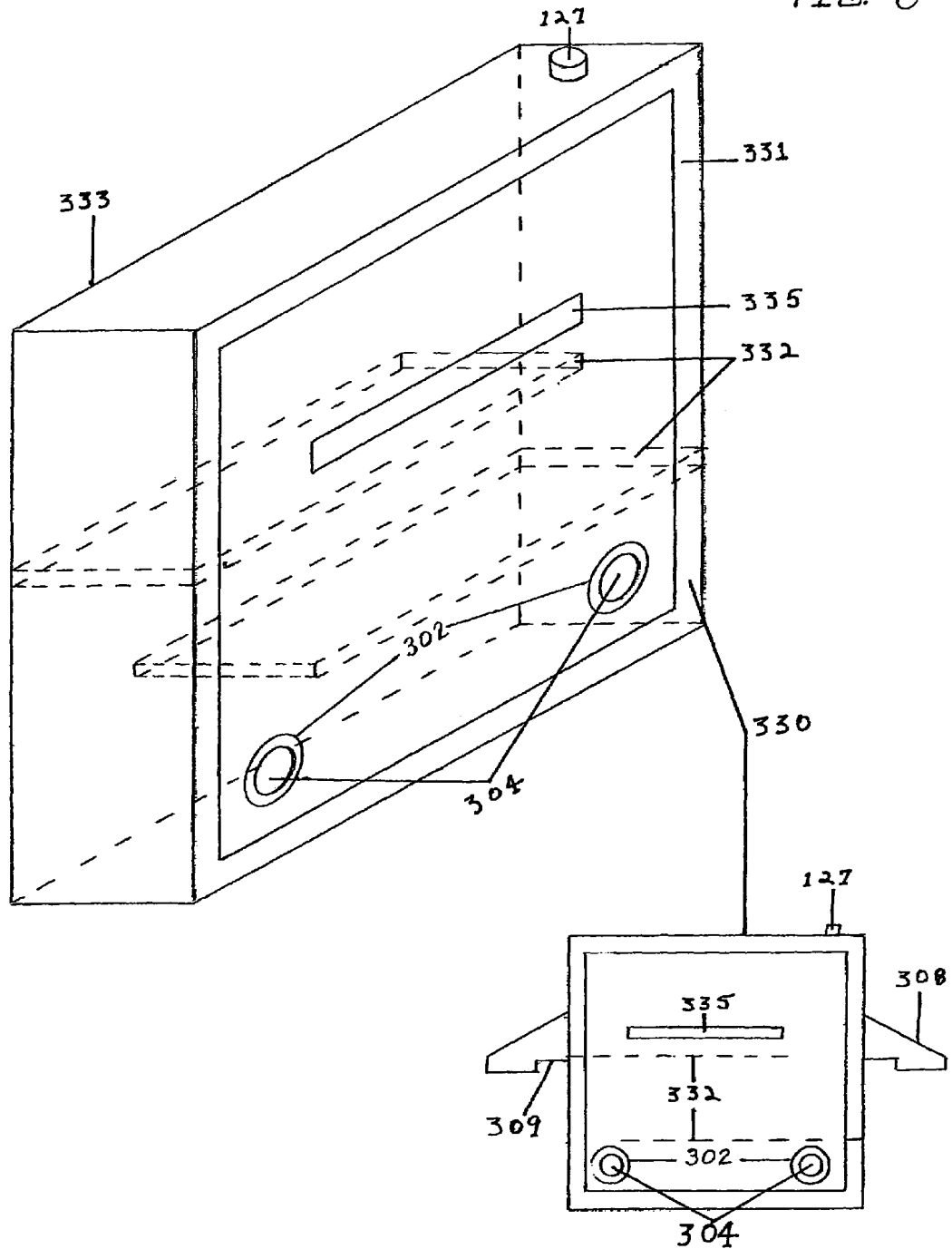
FIG. 8 is an isometric and front view of the effluent mixing chamber of one embodiment of the apparatus.

FIG. 8 is an isometric and front view of the effluent mixing chamber 330 (the isometric view is shown without integral supports). The effluent mixing chamber receives fluid flow through the influent, rectangular port 335 located on the upper portion of the mixing chamber front surface 331 and redirects fluid flow to the head stock 122 of the apparatus via the two gasketed fluid ports 304 located at the bottom inside of mixing chamber front surface 331. The lower, gasketed, fluid ports 304 align with like-gasketed fluid ports 304 in adjacent ESPs 300 thereby creating a continuous fluid conduit 149 (FIG. 4) within confined boundaries isolated from the outside environment. A mixing chamber injection port 127 is located at one edge where fluid flow is reversed by one of two internal baffles 332 for injection and flash mixing of a flocculent aid, chemical reagents, or the like. The back surface 333 of the effluent mixing chamber 330 is contacted by the push plate 146 that is connected to the hydraulic closure mechanism 144 providing closure pressure for the apparatus. Like the influent mixing chamber plate 320, the effluent mixing chamber 330 contains no electrode 141. In one embodiment, the effluent mixing chamber plate is advantageously provided to redirect fluid flow to the head stock 122, provide an injection means, such as the mixing chamber injection port 127, for flocculent and/or chemical reagents and mix same via internal baffles 332, provide a means of contact to the push plate 146 and provide a means of electrical insulation to the supporting frame.

Figure 17:
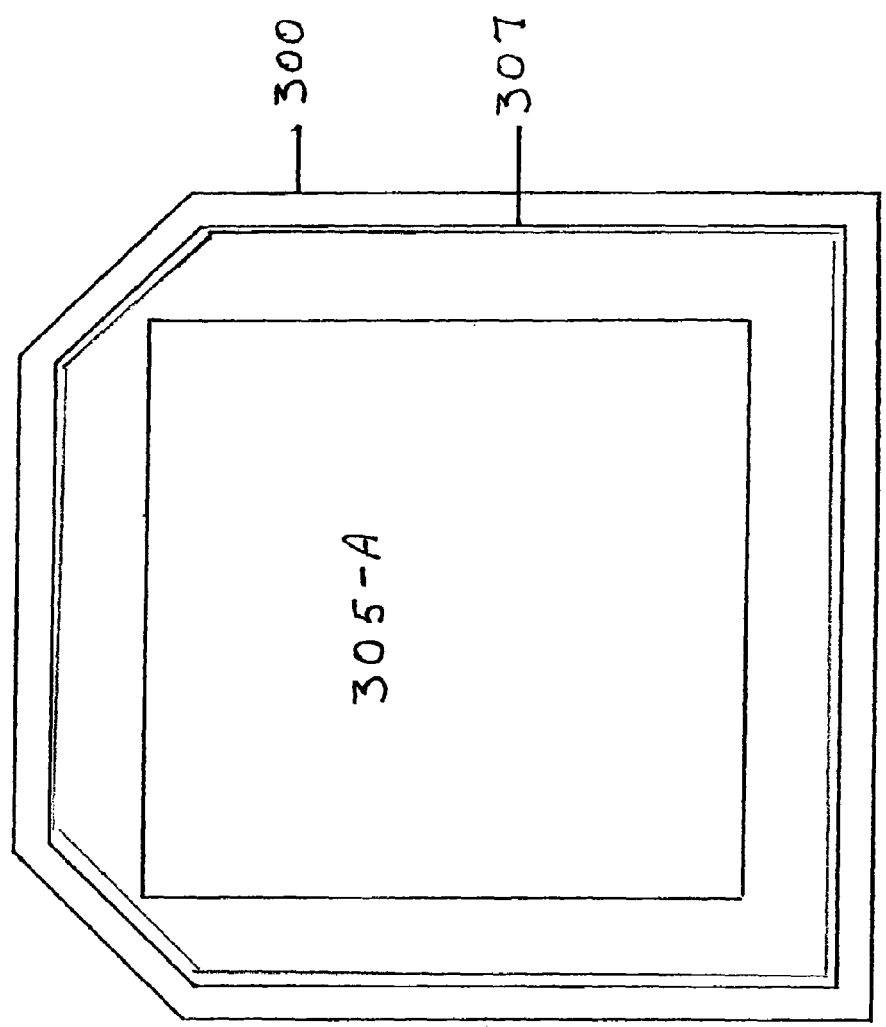
FIG. 17 is a front view of an offset hexagonal electrocoagulation spacer plate of one embodiment of the apparatus.

FIG. 17 is an ESP 300, shaped as an offset hexagon that is utilized for the construction of an alternate design 140-A of the preferred electrocoagulation vessel of the present invention. This alternate design is a cost effective embodiment and is particularly advantageous for non-hazardous environments where explosion proof capability is not required. In this embodiment, the ESP 300 includes a square internal cavity 305-A as opposed to an offset hexagonal internal cavity 305, no ports 301 or 304, no internal recessed boundary support 224, and no rectangular recession 306. Like other ESP 300 it supports an offset hexagonal electrode 142 and seals all fluids within the boundaries of a peripheral gasket 307 held in place by a recessed groove on both front and back surfaces of said ESP 300.

FIG. 16 shows the offset hexagonal electrode 142 utilized with the offset hexagonal ESP 300 of the alternate design 140-A. The electrode 142 is slightly larger than the ESP 300 illustrated in FIG. 17 such that the hatch marked areas denoted A and B protrude past the lines denoted by A–A' and B–B' and become external electrical contacts A and B. A–A' and B–B' define the outer boundary of the ESP 300. Electrical contacts A and B are used to connect to an external electrical attachment means for receiving an applied voltage.

Figure 18:
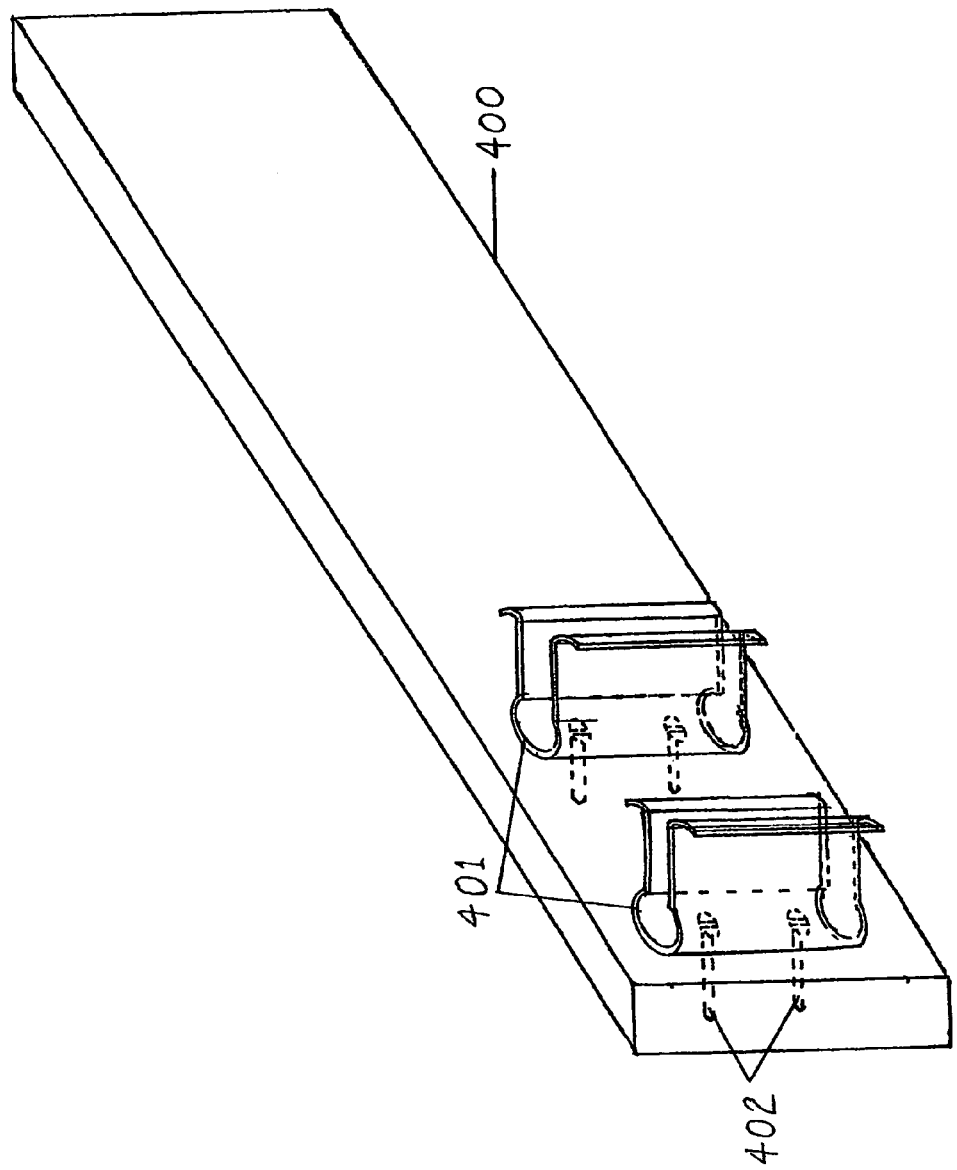
FIG. 18 is an isometric view of an external electrical buss bar attachment of one embodiment of the apparatus.

FIG. 18 is an isometric view of an electrical source, in this case, a rectangular elongate, conductive buss bar 400, that distributes an applied voltage to a plurality of offset hexagonal electrodes 141. Attachment to exposed electrical contacts A and B of electrode 142 FIG. 16 is made with flat clamps 401 perpendicular to and integral with said buss bar 400 providing a means for easily connecting and disconnecting to the electrodes 142, and also allowing different power configurations. Various shapes and sizes of electrodes allow for the exposure of an edge portion suitable for contact with the electrical source or buss bar. The flat clamps 401 are attached by a screw, rivet or other attachment means 402 allowing for replacement and relocation. The conductive buss bar 400 is shown as a simple bar and clamp configuration. The conductive buss bar 400 can be encased in plastic and contain a gasket such that when clamped onto a plurality of closed ESP's 300, the gasket seals against the surface formed by the edges of ESP's 300.

FIG. 19 illustrates the influent mixing chamber 320-A of the alternate design 140-A where influent port 316 is in fluid communication with interconnecting influent pipe 116 through the bottom of said influent mixing chamber 320-A omitting ported electrical and fluid conduit requirements for communication through the head stock 122 of the supporting frame.

FIG. 20 is an effluent mixing chamber 330-A of the alternate design 140-A whereby the fluid ports 304 are re-located to the bottom edge of said effluent mixing chamber 330-A and are in fluid communication with the effluent manifold 317 and the interconnecting effluent pipe 117 providing a means for fluids 110 to exit the apparatus.

FIG. 21 is a top and side view of the alternate design 140-A of the apparatus of the present invention illustrating the alternate modifications discussed in the prior text. Electrical connection to the power supply 130 (not shown) is made by conventional methods familiar to those skilled in the art. The alternate design 140-A of the preferred apparatus of the present invention provides a means of reducing manufacturing costs and maintaining system/equipment integrity utilizing best engineering practices without sacrificing operator safety or risking exposure of potentially hazardous materials to the environment.

Figure 5A:
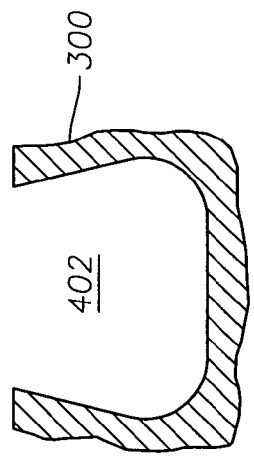
FIG. 5A is a detail of the embodiment of FIG. 5 showing one preferred gasket groove detail.
Figure 5B:
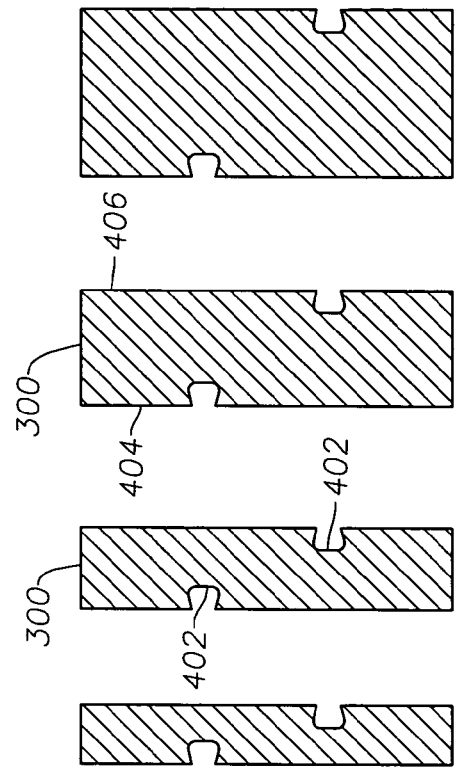
FIG. 5B is a detail of the embodiment of FIG. 5 showing a cut along the C—C line.
Figure 5:
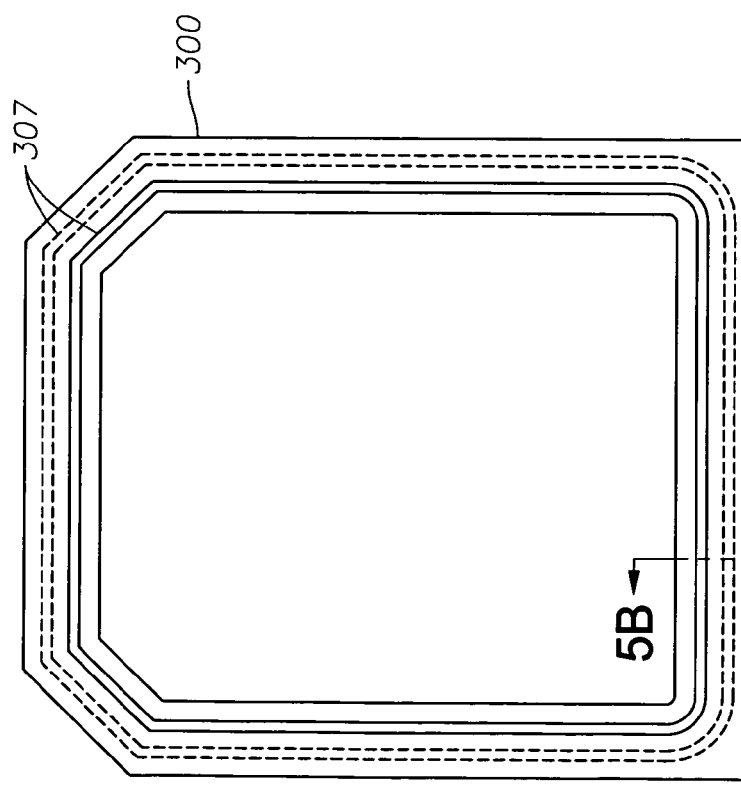
FIG. 5 shows spacer plates of one embodiment of the invention demonstrating staggered peripheral gaskets on opposite side of the spacer plate.

FIG. 5 shows a spacer plate 300 configuration showing staggered peripheral gaskets 307 on opposite sides of the spacer plate 300. The peripheral gasket shown with a dotted line indicates that the peripheral gasket is located on the other side of the spacer plate. Thus, FIG. 5 demonstrates one form of staggering the peripheral gaskets on one plate. The peripheral gaskets 307 are staggered in that the recessed grooves for containing the gasket is not at the same location on the back and front face. For example, the gasket on the front side can be one-third of the distance from the edge of the spacer plate to the cavity while the gasket on the back side can be two-thirds of the distance from the edge of the spacer plate to the cavity. In this manner, the material of the spacer plate is substantially strengthened. Additionally, the gasket of the front face will of this configuration will contact the back surface of the electrode or spacer place that is adjacent, as opposed to contacting another gasket. This creates a stronger seal. FIGS. 5A and 5B show details of the gasket groove design of a preferred embodiment as well as the staggering of the gaskets. This design allows the spacer plates to be positioned adjacent to one another thereby increasing the influent mixing chamber 320 thickness or width without compromising the seal of the gasket against the surface formed by the edges of ESP's 300. This advantageously allows a gasket to surface instead of a gasket-to-gasket seal. This embodiment incorporates two opposing gasket grooves as shown in FIG. 5A, which is a cross section of the C—C line of FIG. 5. This configuration optimizes additional mechanical strength.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

We claim:

1. An apparatus for the high pressure electrocoagulative treatment of viscous fluids, including suspensions, emulsions or sludge, the apparatus comprising:
    (a) An electrocoagulation vessel capable of sustaining elevated pressure, the electrocoagulation vessel having a frame and a plurality of electrocoagulation spacer plates capable of being separated, the frame comprising a head stock, a tail stock, and a plurality of side rails operable to connect to the head stock and to the tail stock, the plurality of electrocoagulation spacer plates being moveably supported by at least one side rail, the vessel including a push plate moveably supported by at least one side rail maintainable in an orientation generally parallel to the electrocoagulation spacer plates when the vessel is in a closed position, the head stock further defining a port capable of allowing fluids to pass out of the electrocoagulation vessel, the plurality of spacer plates further defining a plurality of internal cavities such that, when the spacer plates are brought into contact with each other, the plurality of internal cavities form a cavity chamber;
    (b) A plurality of electrodes in contact with at least a portion of the plurality of electrocoagulation spacer plates;
    (c) An electric conduit including electrical contact terminals being connectable to a power supply and capable of receiving an applied voltage, the electric conduit operable to allow the applied voltage from the power supply to the terminal connections to be applied to at least a portion of the plurality of electrodes, the electrodes capable of contacting the fluid and causing electrical current to flow through the fluid; and (d) Means for moving the plurality of electrocoagulation spacer plates between an open position and a closed position.

2. The apparatus of claim 1 further comprising means for regulating pressure within the electrocoagulation vessel.

3. The apparatus of claim 1 wherein
(a) the electrocoagulation spacer plates further comprise a plurality of gasketed ports on each spacer plates such that, when the spacer plates are in the closed position, the spacer plates define a bore; and
(b) wherein the electric conduit further comprises metal inserts at least partially located in the bore such that, when the spacer plates are in the closed position, a plurality of the metal inserts are operable to contact a metal insert in an adjacent position and an electrode.

4. The apparatus of claim 1 wherein the electric conduit further comprising an electrical source operable to apply voltage to at least a portion of the plurality of electrodes, the electrode having an edge of conductive material, at least a portion of the edge of the electrode being operable to receive the applied voltage from the electrical source.

5. The apparatus of claim 4 wherein the electrodes are of sufficient size and shape that at least a portion of the edge is exposed and is operable to be connected to the electrical source external to the frame of the electrocoagulation vessel, such that the electrical source provides electrical current to the electrodes.

6. The apparatus of claim 1 further comprising means for separating solids from the fluid, the means for separating capable of receiving fluid from the effluent ports.

7. The apparatus of claim 6 wherein the means for separating solids from the fluid includes a physical, mechanical or organic separation device to remove solids to produce a treated fluid and separated materials.

8. The apparatus of claim 1 further comprising a collection tank, the collection tank being in fluid connection with the electrocoagulation vessel.

9. The apparatus of claim 1 further comprising a pump operable to transfer viscous fluids through an influent pipe to the electrocoagulation vessel.

10. The apparatus of claim 9 further comprising a riser pipe in connection with the influent pipe, the riser pipe being of a higher elevation than the electrocoagulation vessel, the riser pipe being operable to collect undissolved gas present in the fluid, the undissolved gases collected then being removed from the fluid.

11. The apparatus of claim 9 further comprising an injection port connected to the influent pipe or the collection chamber prior to the electrocoagulation vessel, the injection port operable to inject chemical reagents into the fluid.

12. The apparatus of claim 1 further comprising a mixing chamber within the electrocoagulation vessel.

13. The apparatus of claim 1, wherein the means for moving the plurality of electrocoagulation spacer plates between an open position and a closed position is operable to maintain an operating pressure greater than pressure resulting from the influent pump such that the electrocoagulation vessel contains the fluid generally within the cavity chamber.

14. The apparatus of claim 1 wherein the plurality of electrocoagulation spacer plates moveably supported by the side rails include a spacer plate support, the spacer plate support defining a spacer plate slot for positioning and alignment the spacer plates on the side rails.

15. The apparatus of claim 1 wherein an effluent fluid conduit is formed by interconnection of a plurality of gasketed ports in the spacer plates.

16. The apparatus of claim 1 wherein each electrode is a plate that defines an electrode opening operable to allow the flow of fluid through the electrode opening and a fluid path is defined by the electrode openings on successive electrode plates.

17. A method of high pressure electrocoagulative treatment of viscous fluids, including suspensions, emulsions or sludge, the method comprising the steps of:

(a) Feeding the fluid into an electrocoagulation vessel capable of sustaining elevated pressure, the electrocoagulation vessel having a frame and a plurality of electrocoagulation spacer plates capable of being separated, the frame comprising a head stock, a tail stock, and a plurality of side rails operable to connect to the head stock and to the tail stock, the plurality of electrocoagulation spacer plates being moveably supported by at least one side rail, the vessel including a push plate moveably supported by at least one side rail maintainable in an orientation generally parallel to the electrocoagulation spacer plates when the vessel is in a closed position, the head stock further defining a port capable of allowing fluids to pass out of the electrocoagulation vessel, the plurality of spacer plates further defining a plurality of internal cavities such that, when the spacer plates are brought into contact with each other, the plurality of internal cavities form a cavity chamber;

(b) Causing the plurality of spacer plates to have a closed position;

(c) Applying a voltage through an electric conduit, the electric conduit including electrical contact terminals being connectable to a power supply and capable of receiving an applied voltage, the electric conduit operable to allow the applied voltage from the power supply to the terminal connections to be applied to at least a portion of a plurality of electrodes in contact with at least a portion of the plurality of electrocoagulation spacer plates, the electrodes capable of contacting the fluid and causing electrical current to flow through the fluid to create a processed fluid;

(d) Removing processed fluid from the electrocoagulation vessel.

18. The method of claim 17 further comprising the step of separating solids from the processed fluid to create a treated fluid and separated material.

19. The method of claim 18 wherein the treated fluid is separated from the separate materials through physical, mechanical or organic separation methods.

* * * * *